United States Patent
Goldstein et al.

(10) Patent No.: US 10,529,325 B2
(45) Date of Patent: *Jan. 7, 2020

(54) PERSONALIZED SOUND MANAGEMENT AND METHOD

(71) Applicant: Staton Techiya, LLC, Delray Beach, FL (US)

(72) Inventors: Steven Goldstein, Delray Beach, FL (US); Gary Hoshizaki, Boca Raton, FL (US); John P Keady, Fairfax Station, VA (US)

(73) Assignee: Staton Techiya, LLC, Delray Beach, FL (US)

( * ) Notice: Subject to any disclaimer, the term of this patent is extended or adjusted under 35 U.S.C. 154(b) by 884 days.

This patent is subject to a terminal disclaimer.

(21) Appl. No.: 14/846,994

(22) Filed: Sep. 7, 2015

(65) Prior Publication Data
US 2015/0379994 A1    Dec. 31, 2015

Related U.S. Application Data

(63) Continuation of application No. 12/560,097, filed on Sep. 15, 2009, now Pat. No. 9,129,291.
(Continued)

(51) Int. Cl.
*G06F 3/16* (2006.01)
*G10L 15/22* (2006.01)
(Continued)

(52) U.S. Cl.
CPC .............. *G10L 15/22* (2013.01); *B25F 5/00* (2013.01); *G06F 21/10* (2013.01); *G06Q 30/012* (2013.01);
(Continued)

(58) Field of Classification Search
CPC .... H04R 25/30; H04R 25/305; H04R 25/453; H04R 25/505; H04R 25/70; G06F 17/30743; G06F 17/3074
(Continued)

(56) References Cited

U.S. PATENT DOCUMENTS 3,902,155 A    8/1975 Young
4,539,440 A    9/1985 Sciarra
(Continued)

FOREIGN PATENT DOCUMENTS

EP    1104155 A2    5/2001
WO    WO 00/28721    5/2000
(Continued)

OTHER PUBLICATIONS

Anonymous, Choose your flavor: Sound ID launches Two new Bluetooth Headsets with Personalized Sound, Business Wire, New York: Oct. 16, 2006. pp. 1-4. (ProQuest Doc ID 114619641.
(Continued)

*Primary Examiner* — Xu Mei
(74) *Attorney, Agent, or Firm* — Akerman LLP; Peter A. Chiabotti; Mammen (Roy) P. Zachariah, Jr.

(57) ABSTRACT

A personalized sound management system for an acoustic space includes at least one transducer, a data communication system, one or more processors operatively coupled to the data communication system and the at least one transducer, and a medium coupled to the one or more processors. The processors access a database of sonic signatures and display a plurality of personalized sound management applications that perform at least one or more tasks among identifying a sonic signature, calculating a sound pressure level, storing metadata related to a sonic signature, monitoring sound pressure level dosage levels, switching to an ear canal microphone in a noisy environment, recording a user's (Continued)

voice, storing the user's voice in a memory of an earpiece device, or storing the user's voice in a memory of a server system, or converting received text received in texts or emails to voice using text to speech conversion. Other embodiments are disclosed.

20 Claims, 15 Drawing Sheets

Related U.S. Application Data

(60) Provisional application No. 61/098,914, filed on Sep. 22, 2008.

(51) Int. Cl.
| | |
|---|---|
| B25F 5/00 | (2006.01) |
| H04R 25/00 | (2006.01) |
| H04R 5/04 | (2006.01) |
| G06F 21/10 | (2013.01) |
| G06Q 30/00 | (2012.01) |
| G06Q 30/06 | (2012.01) |
| G06Q 40/08 | (2012.01) |
| G06Q 30/02 | (2012.01) |
| G10L 13/00 | (2006.01) |
| G10L 25/84 | (2013.01) |
| G05B 19/042 | (2006.01) |

(52) U.S. Cl.
CPC ........... *G06Q 30/018* (2013.01); *G06Q 30/02* (2013.01); *G06Q 30/0281* (2013.01); *G06Q 30/0601* (2013.01); *G06Q 30/0621* (2013.01); *G06Q 40/08* (2013.01); *G10L 13/00* (2013.01); *G10L 25/84* (2013.01); *H04R 5/04* (2013.01); *H04R 25/453* (2013.01); *H04R 25/505* (2013.01); *G05B 19/042* (2013.01); *G06F 2221/2137* (2013.01)

(58) Field of Classification Search
USPC ............. 381/312–323, 328, 60, 26, 74, 384; 600/25; 607/57; 715/716
See application file for complete search history.

(56) References Cited

U.S. PATENT DOCUMENTS

| | | | |
|---|---|---|---|
| 4,731,850 | A | 3/1988 | Levitt et al. |
| 5,033,090 | A | 7/1991 | Weinrich |
| 5,734,961 | A | 3/1998 | Castille |
| 5,894,113 | A | 4/1999 | Wingate |
| 6,469,615 | B1 | 10/2002 | Kady et al. |
| 6,606,596 | B1 | 8/2003 | Zirngibl et al. |
| 8,126,159 | B2 | 2/2012 | Goose et al. |
| 9,129,291 | B2 * | 9/2015 | Goldstein ............... G06F 21/10 |
| 2002/0129056 | A1 | 9/2002 | Conant et al. |
| 2002/0183648 | A1 | 12/2002 | Hou |
| 2003/0185403 | A1 | 10/2003 | Sibbald |
| 2005/0015606 | A1 | 1/2005 | Blamires et al. |
| 2005/0049492 | A1 | 3/2005 | Sweeney et al. |
| 2005/0098681 | A1 | 5/2005 | Berson et al. |
| 2005/0105750 | A1 * | 5/2005 | Frohlich ............... H04R 25/507 381/314 |
| 2005/0144132 | A1 | 6/2005 | Lin |
| 2005/0251224 | A1 * | 11/2005 | Berg .................... H04R 25/505 607/57 |
| 2006/0158956 | A1 | 7/2006 | Laugharn et al. |
| 2006/0233395 | A1 | 10/2006 | Orten |
| 2006/0262935 | A1 | 11/2006 | Goose et al. |
| 2007/0098195 | A1 * | 5/2007 | Holmes ................ H04R 25/558 381/315 |
| 2008/0091605 | A1 | 4/2008 | Hughes et al. |
| 2008/0120115 | A1 | 5/2008 | Mao |
| 2008/0162133 | A1 | 7/2008 | Couper et al. |
| 2008/0165980 | A1 * | 7/2008 | Pavlovic ................ H03G 9/005 381/60 |
| 2008/0177998 | A1 | 7/2008 | Apsangi et al. |
| 2008/0178088 | A1 | 7/2008 | Goldstein et al. |
| 2008/0267422 | A1 | 10/2008 | Cox |
| 2009/0110223 | A1 | 4/2009 | Semcken |
| 2009/0183560 | A1 | 7/2009 | Henne et al. |
| 2009/0190767 | A1 | 7/2009 | Aaron et al. |
| 2009/0204243 | A1 | 8/2009 | Marwaha et al. |
| 2009/0220096 | A1 * | 9/2009 | Usher ..................... H03G 3/32 381/57 |
| 2010/0002897 | A1 | 1/2010 | Keady |
| 2010/0033313 | A1 | 2/2010 | Keady et al. |
| 2010/0232634 | A1 | 9/2010 | Boldt |
| 2012/0021732 | A1 | 1/2012 | Lam |

FOREIGN PATENT DOCUMENTS

| | | |
|---|---|---|
| WO | WO 08014482 | 1/2008 |
| WO | WO 08061260 | 5/2008 |
| WO | WO 08153589 | 12/2008 |
| WO | WO 09082765 | 7/2009 |

OTHER PUBLICATIONS

PCT International Search Report for PCT Application No. PCT/US07/74641 dated Jul. 17, 2008.
PCT Internation Search Report for PCT Application No. PCT/US07/85134 dated Jun. 12, 2008.
PCT Written Opinion for PCT Applicaiton No. PCT/US07/85134 dated Jun. 12, 2008.
PCT Written Opinion for PCT Application No. PCT/US08/88417 dated Apr. 9, 2009.
Patent Cooperation Treaty, "International Search Report," issued in International Patent Application No. PCT/US09/57751, by U.S. Search Authority, dated Nov. 6, 2009, document of 2 pages.

* cited by examiner

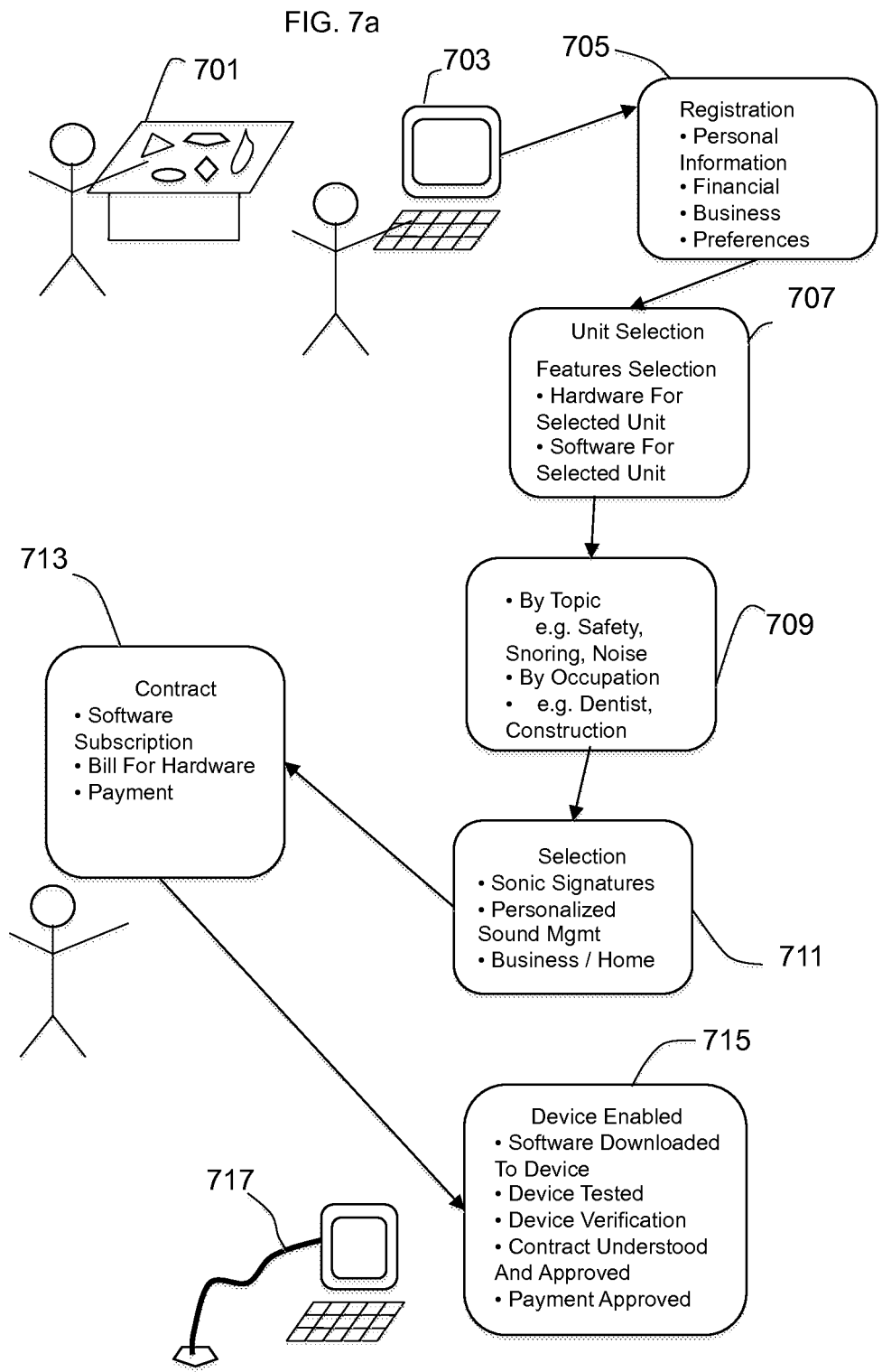

PERSONALIZED SOUND MANAGEMENT AND METHOD

CROSS-REFERENCE TO RELATED APPLICATIONS

This application is a continuation of U.S. application Ser. No. 12/560,097 filed on 15 Sep. 2009 and claims the benefit of U.S. provisional patent application No. 61/098,914 filed 22 Sep. 2008. The disclosure of the aforementioned applications are both incorporated herein by reference in their entireties.

FIELD OF THE INVENTION

The invention relates in general to methods of managing sound, and particularly though not exclusively, is related to personalized sound management.

BACKGROUND OF THE INVENTION

The world of two hundred years ago is substantially different than the present day earth. Similarly, the acoustic environment that surrounds us is also changing. For example, the sounds of a large city have changed as the mode of transportation transitioned from walking and horse and buggy, to cars, subways, and airplanes.

In general, humans are continuously inundated by a diversity of sounds. Many of the sounds are not critical to our lives but our brain processes these sounds and tries to distinguish between them. Background sound levels can also make it difficult to hear sounds that are important. Too much acoustic information can cause an auditory overload that can impact both the health and safety of an individual.

SUMMARY

The invention relates in general to methods and system for implementing a suite of personalized sound applications for modifying a user's acoustic environment and more particularly, though not exclusively, to facilitating the adoption of the technology, ensuring the technology functions properly, protecting both the manufacturers and consumer, and providing user selection and control over the management of sound.

At least one exemplary embodiment is directed to a method of personalized sound management comprising the steps of: selecting at least one of a plurality of personalized sound management applications through a client system where the user selects the at least one of the plurality of personalized sound management applications from a website; accepting a subscription contract for using the at least one of the personalized sound management applications; and loading the selected at least one of the plurality of applications from a server system to a device where the device has at least one microphone, at least one speaker, and a processor configured to identify sonic signatures where each sonic signature is identified using a Gaussian mixture model.

At least one exemplary embodiment is directed to a method of implementing personalized sound management comprising the steps of: recording sound with a microphone of a communication device; analyzing the sound for acoustic information relevant for personalized sound management applications; storing a sonic signature in a memory of the communication device; calculating a sound pressure level of the sonic signature; and attaching and storing metadata related to the sonic signature and sound pressure level including a time stamp and geocode.

BRIEF DESCRIPTION OF THE DRAWINGS

Exemplary embodiments of the present invention will become more fully understood from the detailed description and the accompanying drawings, wherein:

FIGS. 7a and 7b are diagrams illustrating a consumer purchase process in accordance with at least one exemplary embodiment;

DETAILED DESCRIPTION OF EXEMPLARY EMBODIMENTS OF THE PRESENT INVENTION

Figure 1:
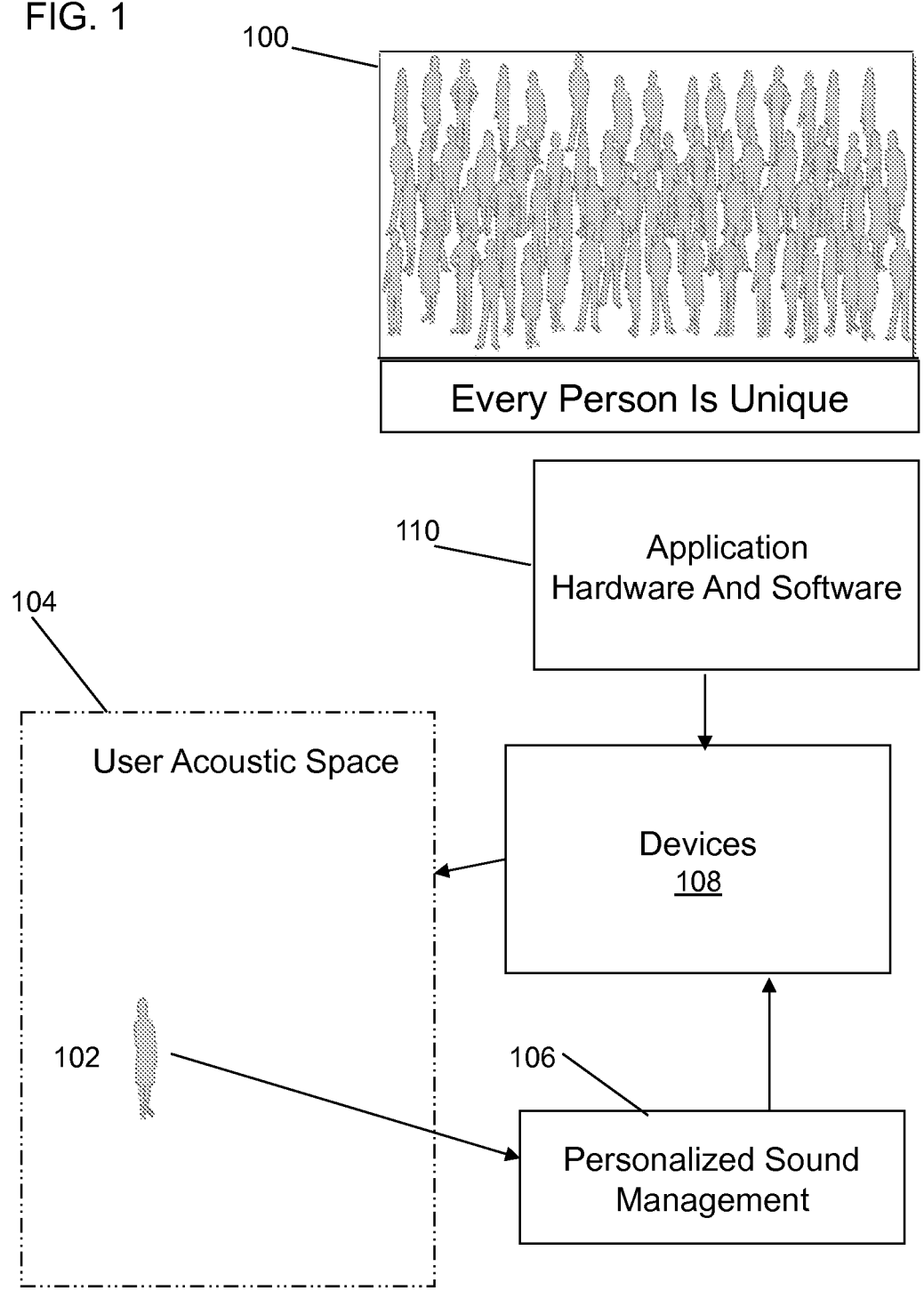
FIG. 1 illustrates a block diagram of the interaction of personalized sound management in accordance with at least one exemplary embodiment.

The following description of exemplary embodiment(s) is merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example specific computer code may not be listed for achieving each of the steps discussed, however one of ordinary skill would be able, without undo experimentation, to write such code given the enabling disclosure herein. Such code is intended to fall within the scope of at least one exemplary embodiment.

Additionally, the sizes of structures used in exemplary embodiments are not limited by any discussion herein (e.g., the sizes of structures can be macro (centimeter, meter, millimeter, micro (micro meter), nanometer size and smaller).

Notice that similar reference numerals and letters refer to similar items in the following figures, and thus once an item is defined in one figure, it may not be discussed or further defined in the following figures.

In all of the examples illustrated and discussed herein, any specific values, should be interpreted to be illustrative only and non-limiting. Thus, other examples of the exemplary embodiments could have different values.

FIG. 1 is a diagram of personal sound management in accordance with at least one exemplary embodiment. In our global community 100, each person is unique. The differences between individuals can be genetic, cultural, environmental, personal, or physical to name just a few. The combination of these traits is what makes us unique. One of the main senses a human relies on is our auditory sense. Hearing impacts every aspect of our life from communication to safety. How each individual perceives and uses sound is also unique.

From an acoustic perspective, sound pressure levels have been rising steadily. The diversity of sounds is also increasing. The human brain continuously processes the acoustic information provided by the ears. Both the sound pressure levels and the sound diversity puts increasing strain on a person to determine what they need to hear versus what they are hearing. Ultimately, this "acoustic overload" can manifest itself in physical ailments and health risks such as stress, sleeplessness, and depression.

A person 102 has an acoustic space 104 from which a majority of sounds they receive emanate. Some of the sounds are useful to person 102 and some sounds may have no use. Acoustic space 104 can be large or small. Acoustic space 104 will change with time and location. For example, acoustic space 104 can be a room, a stadium, a forest, an automobile, a plane, or the ear canal of person 102. Personalized sound management (PSM™) 106 is the ability to modify what is received from acoustic space 104 thereby tailoring or personalizing the received acoustic information to meet the needs of person 102.

Devices 108 are a source of acoustic information within acoustic space 104. In general, device(s) 108 have a speaker, a microphone, or one or more of both. In general, application hardware and software 110 is incorporated in, although can be external also, device(s) 108 to allow personalization of acoustic space 104. Person 102 selects the applications and controls device(s) 108 to modify acoustic space 104 to meet their personal needs and wants. The benefit and utility of personalizing and managing sound received by person 102 will be disclosed in more detail.

Figure 2:
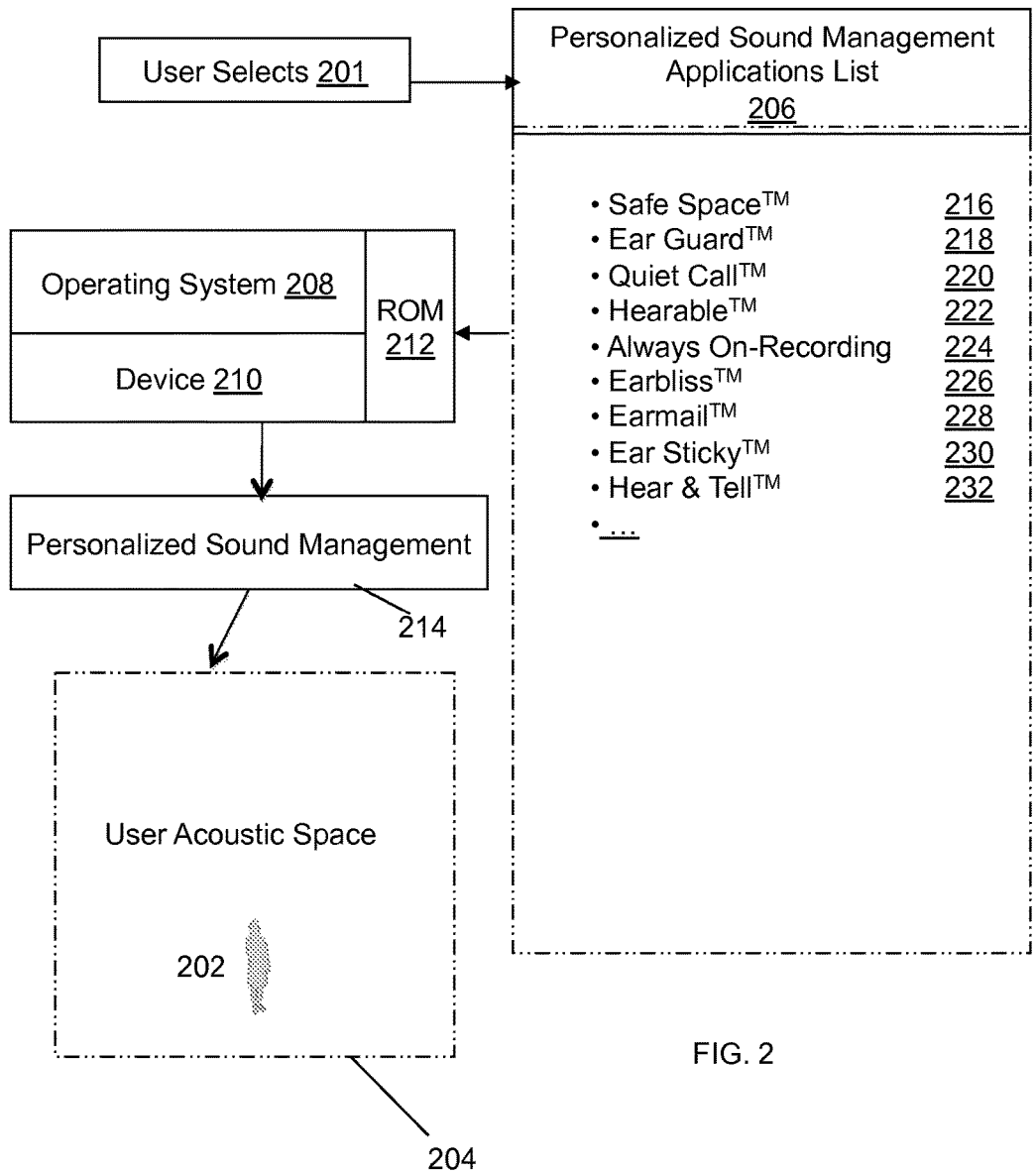
FIG. 2 illustrates a block diagram of a partial list of applications for personalized sound management in accordance with at least one exemplary embodiment.

FIG. 2 is a diagram illustrating a partial list of applications for personalized sound management in accordance with at least one exemplary embodiment. A user 202 has an acoustic space 204 that includes both real sounds and potential sounds. In many cases, acoustic space 204 can be inundated with a variety of sounds not under control of user 202. This lack of control over acoustic information and sound within acoustic space 204 can make for a reduction in quality of life, loss of efficiency, or more seriously affecting user's 202 health and safety.

In at least one exemplary embodiment, a user 202 selects 201 at least one personalized sound management application from a personalized sound management applications list 206. Although only a partial list, applications such as Safe Space™ 216, EarGuard™ 218, Quiet Call™ 220, Ear Sticky™ 230, Hearable™ 222, Always On-Recording™ 224, Earbliss™ 226, Hear & Tell™ 232, and Ear Mail™ 228 will be used to illustrate how acoustic space 204 is personalized and managed for the benefit of user 202. A more detailed explanation of personalized sound management applications 206 will be described.

The selected applications of user 202 are loaded into ROM 212. An operating system 208 is configured operably with device 210 and ROM 212. Operating system 208, in conjunction with personalized sound management applications 206, provides an interface to the user for personalized sound management 214 to meet user needs to manage user acoustic space 202 and for controlling device 210.

ROM 212 can be read only memory such that the selected applications from personalized sound management list 206 cannot be tampered with or rewritten. However in at least one exemplary embodiment ROM 212 can also be memory that can be read and written to so that a user can change settings. Alternately, ROM 212 can be other types of memory such as fe-ram, phase change memory, magneto-resistive memory, hard drive, sram, dram, eprom, eeprom, and other non-volatile or read only memories where the selected applications are secure from any type of downloading, tampering, or modification through physical or software protection. Monitoring of ROM 212 and the selected applications can also be added where notification is sent or device 210 is disabled when an improper action is detected. ROM 212 ensures that an application will operate as disclosed for user 202.

Components of device 210 can be built in a single unit or operatively coupled units. For example, multiple devices of 210 can be wired, optically connected, wirelessly connected or a combination thereof. Operating system 208 can be run remotely to operate device 210 or reside within device 210. Similarly, ROM 212 can be located in device 210 or remote to device 210. In at least one exemplary embodiment, operating system 208 resides in ROM 212. Device 210 typically has at least one microphone or at least one speaker, or both. The at least one microphone provides acoustic information for use in conjunction with personalized sound management applications. The at least one speaker provides acoustic information to user 202 and acoustic space 204. Device 210 has a microprocessor (not shown) for running applications 206. In at least one exemplary embodiment the microprocessor is dedicated to running personalized sound management applications 206.

In general, personalized sound management applications are customizable point solutions that allow user 202 to handle a variety of tasks associated with managing acoustic space 204. The selection of personalized sound management applications will depend on the person, the device, and the acoustic space being managed. Non-limiting examples of devices that can use personalized sound management applications with the appropriate hardware and operating system, are earpieces, media devices, and vehicles.

Described hereinbelow are brief overviews of the user selected personalized sound management applications:

Safe Space™ 216 is an "intelligent hearing" application that detects and outputs a response based on the identification of a recognized sound. The concept of recognizing sounds is described as Sonic Signature Detection. Safe Space™ 216 also includes a user defined hierarchy and can provide responses based on the hierarchy.

A brief example is provided of how Safe Space™ 216 manages the acoustic space corresponding to the interior of an automobile. As is well known, automobiles are designed to have a quiet interior space. Sound insulation is deliberately placed around the car interior to attenuate sounds coming from the car exterior. Furthermore, automobile drivers often listen to high volume music while driving. This combination makes it difficult to hear sounds such as emergency vehicles. People often get seriously injured because they hear the emergency vehicle when it is in close proximity to the vehicle and panic causing an accident. All descriptions below describing personalized sound management applications assume that the device using the application has incorporated within it the hardware and software required to run the application and perform the application function.

In this example, Safe Space™ 216 detects emergency vehicle horns when they are a substantial distance away. In at least one exemplary embodiment, a microphone is exterior to the car and can pick up sounds in the ambient or car exterior. Sonic signatures related to emergency vehicles such as fire trucks, ambulances, and police cars are stored in the system. Safe Space™ 216 analyses sounds from the microphone. A response is provided if one of the stored sonic signatures is detected. In at least one exemplary embodiment, upon detecting a fire truck siren, Safe Space™ 216 can initiate playing the identified signal through the car stereo system for the car driver to hear and respond to. In at least one exemplary embodiment, Safe Space™ 216 can calculate the direction, distance, and street (through GPS) of the approaching emergency vehicle. The information is then provided visually or vocally to the driver. For example, the car stereo automatically turns down the music and states through the speaker system that an ambulance is coming east bound on $3^{rd}$ Street or an ambulance is approaching from the right.

EarGuard™ 218 is a personalized sound management application that improves listening quality and safety. Hearing disorders are increasing at a very high rate. Many people live in an environment such as a noisy urban environment or an industrial manufacturing area where sound pressure levels are consistently high. Moreover, people themselves are subjecting themselves to loud and sustained sounds. Examples of extreme or sustained sound exposure are portable media players using earbuds, sport shooting, and rock concerts. The trend is a growing population of people that have or will have hearing problems.

The ear is a very sensitive instrument having a large dynamic range that allows us to hear sounds ranging from a whisper to a shout. Subjecting the ear to man-made cacophony is now known to metabolically exhaust the highly specialized sensory cells in the inner ear, causing them to die and be replaced by scar tissue in the hearing organ. Ear Guard™ 218 is an application that monitors the sound exposure of the user and protects the ear from damage.

Briefly, Earguard™ 218 improves listening quality and safety by employing a personal hearing zone that measures sound levels within the ear and in one exemplary embodiment an intelligent level control to protect against over amplification. Earguard™ 218 includes a sound pressure level (SPL) dose management system. The SPL dose management system takes into account both transient and long term sound. In at least one exemplary embodiment, when sound at the user's eardrum is above a certain threshold known to begin the process of metabolically exhausting the ear, the metric known as SPL Dose increases. The SPL dose decreases when sound is below that threshold according to a recovery function that mirrors the recovery of the ear from excessive sound exposure. In at least one exemplary embodiment, Earguard™ 218 will indicate to the user damage to the ear is likely if the sound exposure is continued. In this scenario, the user has the control to take the appropriate action to protect his/her ears.

In at least one exemplary embodiment, an intelligent level adjustment system is a personalized sound management application that automatically estimates the preferred listening level of an audio content signal (e.g. speech or music audio from a device) depending on an analysis of the level, other acoustic features of the ambient environment, and an analysis of the audio content signal. Thus, a human-machine relationship is nurtured with this bi-directional control flow from human to the intelligent level adjustment system and from intelligent level adjustment system to the human user.

A substantial benefit of an application such as Earguard™ 218 is the protection of the ear from damage. Furthermore, this safeguard if propagated will prevent hearing loss thereby reducing the financial burden on the economy in years to come for the individual, business, and government for hearing loss remedies. Thus, using Earguard™ 218 could not only stem the growth in hearing related problems but greatly reduce it over the years to come.

Quiet Call™ 220 is an application that allows user 202 having heard a voice message to respond to the remote caller through a non-verbal means. An example of a non-verbal response is a key-pad entered text message. The entered text message is converted to a speech audio message and is sent to the remote caller. The caller then receives the speech audio message.

An example of the utility of Quiet Call™ 220 is illustrated when user 202 is in an important business meeting but is required to provide input to another remote meeting. User 202 receives the voice message sent from someone in the remote meeting. User 202 responds by entering the response through his/her phone keypad; the text is converted to voice and sent to the person at the remote meeting who sent the original message. User 202 does not have to interrupt the meeting to listen to the voice message nor to reply. Thus, the meeting attended by user 202 can move forward with little or no loss of momentum that would occur if the meeting was disrupted by the call.

Hearable™ 222 is a speech enhancement application that improves voice communication. For example, Hearable™ 222 can be used with an earpiece device having at least two microphones, an ambient sound microphone for receiving sounds in the ambient environment and an ear canal microphone for receiving sounds in the ear canal. A common use for the earpiece would be with a communication device such as a cell phone or other phone system. The earpiece using the Hearable™ 222 application would normally use the ambient sound microphone for receiving and transmitting the user's spoken voice. In this mode, the user's voice will be natural sounding and easily recognizable on the receiving end.

In a noisy environment it can be difficult to carry on a telephone conversation. The ambient sound microphone will pick up the voice and the noise in the ambient environment. The earpiece will switch to the ear canal microphone when the ambient sound microphone detects a high background noise level. The user's voice is readily picked up by the ear canal microphone but the noise in the ambient environment is substantially reduced. Switching to the ear canal microphone allows the receiving party to clearly hear the user's voice. The problem with using the ear canal microphone is that user's voice received in the ear canal sounds different because of frequency roll off in the upper spectrum of the voice range. Although the user can be heard clearly, the user's voice may not sound right to the receiving end.

Hearable™ 222 is a personalized sound management application that improves the sound quality of the user's voice. Hearable™ 222 uses a combination of the sound received by the ambient sound microphone and the ear canal microphone to create a more natural sounding voice. The combination of the two signals is a function of the background noise level. Explaining further the signal from the ambient sound microphone is used less as the background noise level increases. Hearable™ 222 allows a user to have a conversation in a noisy environment while providing a high quality voice signal that is intelligible and recognizable at the receiving end.

Always On-Recording™ 224 is a personalized sound application that acts as its name implies. A device using the Always On-Recording™ 224 application is recording the most current audio information for user recall. The recording is stored in a buffer that will allow the user to immediately access the audio information. The buffer will have a finite amount of storage. The recording time will be a function of the buffer or memory available for the Always On-Recording™ 224 application.

Always On-Recording™ 224 provides utility for short durations of recording. For example, in an application where a user is receiving information such as a phone number or driving directions. The user knows that the device employing Always On-Recording™ 224 has the stored acoustic information and can immediately listen-again to the buffer contents thereby repeating the phone number or driving directions. Similarly, if the user was discussing a contract term and wanted to know exactly what the person said, the user could immediately re-listen to make sure that what they thought they heard is exactly what they heard.

Earbliss™ 226 is a personalized sound management application to provide acoustic isolation from someone who snores while allowing other sounds to be heard. A large percentage of the population suffers though sleepless nights because of the sounds generated by people with sleep apnea and more generally due to loud snoring. Moreover, sleep deprivation can have serious consequences related to health and disposition.

Earbliss™ 226 is a sleep zone technology that utilizes sonic signature detection to insulate sleep partners against intrusion from snoring while still providing awareness of priority sounds. In this example, a sonic signature is acoustic information related to the sounds of a person snoring. In at least one exemplary embodiment, Earbliss™ 226 is an application that is used in conjunction earpieces.

Sealing the ear canal with ear plugs will attenuate the snoring but also blocks out all sounds. Hearing is one of the most vital senses that we have. Under normal conditions we cannot turn off our hearing which allows us to wake in a critical situation. Ear plugs will block out sounds of consequence. For example, the user may not hear their baby crying or a child leaving their room.

Earbliss™ 226 enables a user to attenuate snoring while hearing other sounds around them. The earpieces fit in the ear canal of the user to seal or partially seal the ear canal. The earpieces have an ambient sound microphone for receiving acoustic information from the ambient environment and an ear canal receiver for providing sound to the user's ear canal. As mentioned previously, the earpieces will have a sonic signature related to snorer's snoring stored in memory in the device.

The ambient sound microphone picks up all sounds in the ambient environment including the snorer's snoring. The earpiece processes all the acoustic information coming from the ambient sound microphone and looks for signals similar to stored sonic signatures. Pattern recognition approaches are applied based on the known sonic signatures to detect the snoring sounds from their corresponding sonic signatures. More specifically, sonic signatures can then be compared to learned models to identify a corresponding snoring sound. Once identified the snoring sound is suppressed and not output to the ear canal by the ear canal receiver. Thus, the wearer of the earpieces does not hear the snoring.

Conversely, sounds in the ambient environment that are not recognized through the processing of acoustic information by the earpieces can be passed transparently to the ear canal receiver for reproduction within the ear canal. In this mode, the sound produced in the ear canal sufficiently matches the ambient sound outside the ear canal, thereby providing a "transparency" effect other than the suppressed sonic signature (snoring). The earpieces can also enhance sound. For example, the earpieces having sonic signatures related to a fire truck siren or a baby crying can detect either signal and then amplify the signal (fire truck siren, baby crying) so as to make the wearer of the earpieces aware of the signal's detection. Thus, Earbliss™ 226 modifies the acoustic environment of the user to eliminate what does not need to be heard while allowing the user to be aware of other sounds in a normal context.

Ear Mail™ 228 is a personalized sound management application for converting text to voice. In particular, Ear Mail™ 228 provides great utility to users of email and text messaging although not limited to these examples. Email and text messaging is becoming a very popular form of communication among a large portion of the population. It is not always convenient or in some cases not prudent to review written text depending on the situation.

Ear Mail™ 228 converts the text of a message or email to a speech audio message using a text to speech algorithm. The converted speech audio message is replayed through a loudspeaker coupled to a device using the Ear Mail™ 228 application. For example, Ear Mail™ 228 used in a smart phone coupled to the stereo system of a car through a blue tooth connection could playback the text or emails through the car speakers. The user could hear their messages while driving safely down the road.

Ear Sticky™ 230 is a personalized sound management application for recording information that can be saved and used for future use. In at least one exemplary embodiment, Ear Sticky™ 230 is a mobile communication application that can be used in a device such as a cell phone or an earpiece that is operably coupled to other devices. Ear Sticky™ 230 can record communication through a device or sounds in the ambient environment. Sounds in the ambient environment are recorded by an ambient sound microphone.

In a first example of an Ear Sticky™ 230 application, a conversation between a husband and wife occurs and a list of items to pick up at several stores is disclosed. The user of Ear Sticky™ 230 does not need to write down or remember this list. The conversation is being recorded and stored in a buffer. The user activates Ear Sticky™ 230 to store the recorded conversation to be reviewed at a later time. Thus, the user of Ear Sticky™ 230 could recall and listen to the list on the way home to ensure that the right items are picked up at the appropriate store.

In a second example of an Ear Sticky™ 230 application, a device records with an ambient sound microphone. For example, the user of Ear Sticky™ 230 comes up with a great concept to solve a problem he or she has been working on for some time. The user can enable Ear Sticky™ 230 and uses the ambient sound microphone to record his or her voice to convey the idea, concept, or thoughts and store it for review at a later time. In general, Ear Sticky™ 230 provides utility and convenience in storing and recalling sounds in one's acoustic space.

Hear & Tell™ 232 is a personalized sound management application for recording a sound, training a Gaussian mixture model to learn features of the sound and then storing the Gaussian mixture model in memory of the device. A user of Hear & Tell™ 232 can record the sound or provide a sound, called herein as a sonic signature. The device is operably coupled to at least one microphone to compare sounds received from the microphone against the stored sonic signature. The device can perform an operation that modifies the user's acoustic space 204 once a sound is identified as being similar to a sonic signature. Examples of several operations the device can perform are passing the detected signal through to the user, boosting the sound such that the user is made aware of the detected sound, rejecting the sound so the user does not hear the detected sound, attenuating the detected sound, and replacing the detected sound with an alternate sound to name.

The Hear & Tell™ 232 application will store a Gaussian mixture model (GMM) for every sonic signature that it has been trained to recognize. Each GMM is completely specified by a mixture of mean vectors, a mixture of covariance matrices, and a mixture of weights.

An example of a warning sound (e.g. siren of emergency vehicle) will be used to further illustrate the Hear & Tell™ 232 learning application. Each GMM provides a model for the distribution of the feature statistics for each warning sound in a multi-dimensional space. Upon presentation of a new feature vector, the likelihood of the presence of each warning sound can be calculated. In at least one exemplary embodiment, each warning sound's GMM is evaluated relative to its anti-model, and a score related to the likelihood of that warning sound is computed in order to determine if a sound is detected. A threshold can be applied directly to this score to decide whether the warning sound is present or absent. Similarly, a sequence of scores can be relayed and used in a more complex rule set to determine absence or presence of the sound. Thus, Hear & Tell™ 232 allows a user to store, model, and train a device for sonic signatures under user control and selection thereby allowing a user to modify their acoustic space through the detection of a sound and response by the device.

In general, personalized sound management applications are customizable point solutions that allow user 202 to handle a variety of tasks associated with managing acoustic space 204. The selection of personalized sound management applications will depend on the person, the device, and the acoustic space being managed. Examples of devices that can use personalized sound management applications with the appropriate hardware and operating system, but not limited to these examples, are earpieces, media devices, and vehicles.

As described hereinabove, a suite of personalized sound management applications 206 are provided. The user 202 can select the desired applications and have control over their acoustic space 204. The selected applications are stored in ROM 212. Under user control, user 202 selects the parameters of personalized sound management applications 206 using operating system 208 for implementing applications 206 in device 210 for managing acoustic space 204 based on the individual's needs and wants.

Figure 3:
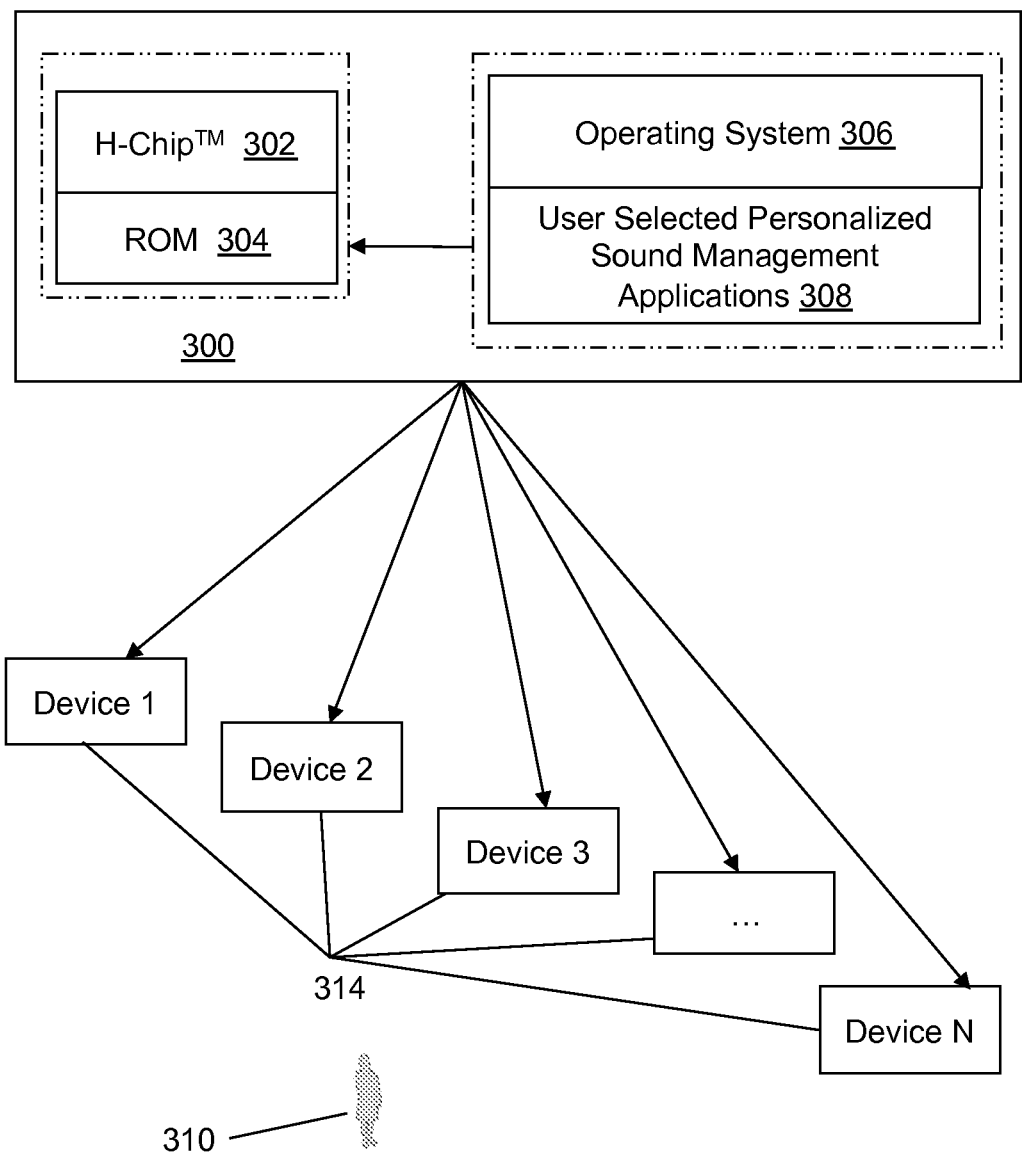
FIG. 3 illustrates a block diagram of the interaction of a personalized management enabled device with other devices in accordance with at least one exemplary embodiment.

FIG. 3 is a diagram illustrating a module 300 for implementing personalized sound management in accordance with at least one exemplary embodiment. Module 300 comprises an H-Chip™ 302, a ROM 304, an operating system 306, and user selected personalized sound management applications 308. In at least one exemplary embodiment, module 300 comprises the H-Chip™ 302 with ROM 304 built into H-Chip™ 302. Both operating system 306 and user selected personalized sound management applications 308 are stored on ROM 304. Alternately, H-Chip™ 302 and ROM 304 can be separate chips allowing for a larger block of memory.

H-Chip™ 302 is a microprocessor, DSP, or logic circuit that implements personalized sound management applications 308. H-Chip™ 302 is optimized for low power dissipation while running user selected personalized sound management applications 308. In at least one exemplary embodiment, H-Chip™ 302 can be a dedicated engine for running applications 308.

Module 300 comprises an application engine (firmware) and a dedicated processor that simplifies the integration of user selected and user controlled personalized sound management applications 308 into a device. In an exemplary embodiment, module 300 is integrated into each device in devices 314. Devices 314 typically, although not always have at least one microphone and at least one speaker. User 310 in conjunction with module 300 can personalize how each device manages sound to the user.

An additional aspect of module 300 is that a third party manufacturer merely builds the acoustic portion of their device around module 300. In an exemplary embodiment, a manufacturer does not and cannot modify operating system 306 and user selected personalized sound management applications 308. Thus, the manufacturer saves time, effort, and money through the seamless integration module 300 into a single hardware solution for maximum transportability into $3^{rd}$ party form factors.

Figure 4:
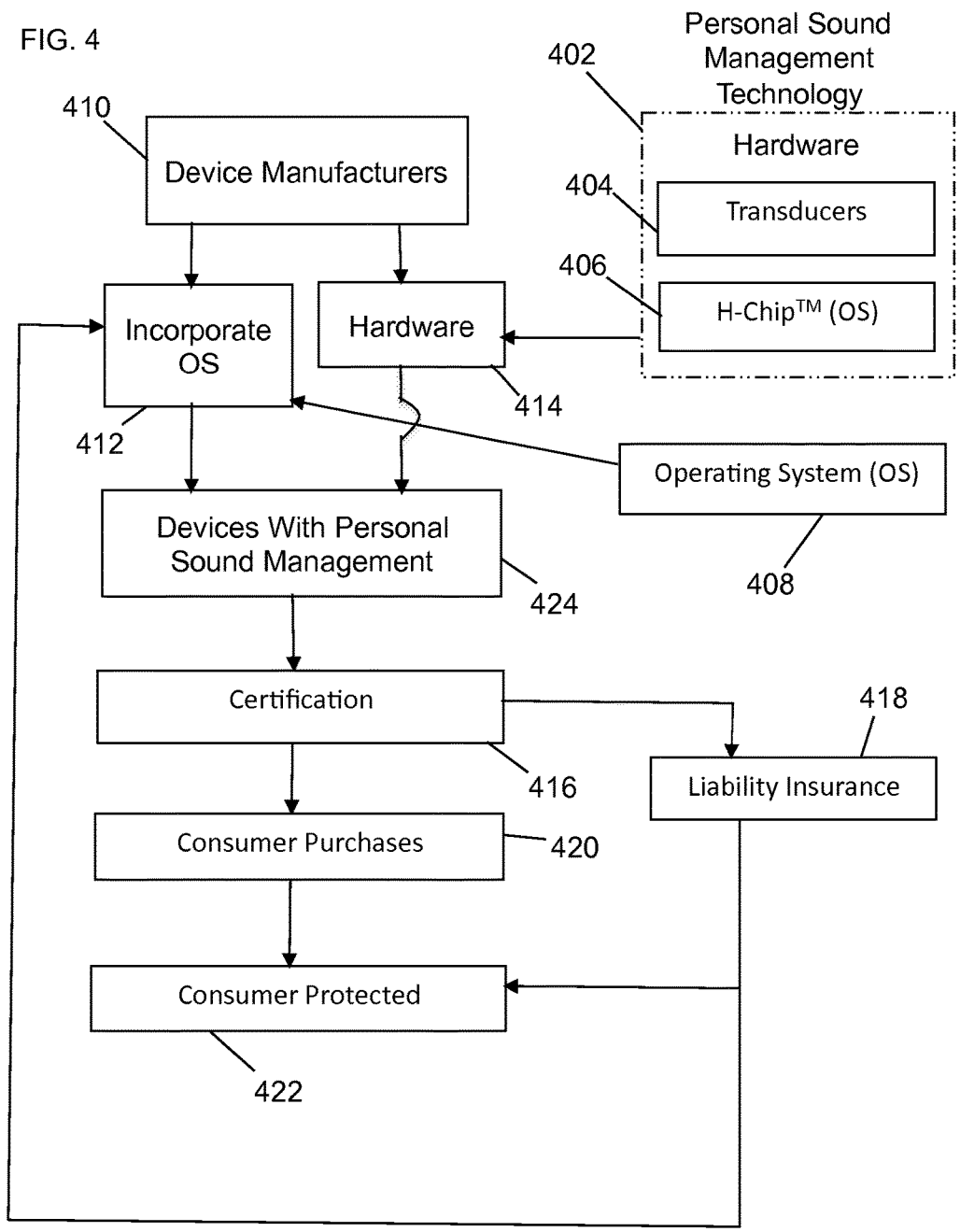
FIG. 4 illustrates a flow chart of a process of providing personalized sound management in accordance with at least one exemplary embodiment.

FIG. 4 is a diagram illustrating a process of providing personalized sound management in accordance with at least one exemplary embodiment. In general, the technology related to providing personalized sound management comprises hardware components and software. In at least one exemplary embodiment, the hardware 402 comprises transducers 404 and H-Chip™ 406.

Transducers 404 are speaker and microphones for respectively providing and receiving sound in an acoustic space. Depending on the application, the size and form factor of transducers 404 may be a critical design parameter. Transducers 404 can be a speaker for providing high fidelity sound to enhance a user's experience. Similarly, transducers 404 can be a microphone for receiving acoustic information and in some cases can pick up sounds inaudible to the user.

H-Chip™ 406 can be a microprocessor, digital signal processor, logic circuit, or applications specific integrated circuit for use implementing the software applications listed hereinabove and other programs related to personalized sound management. H-Chip™ 406 includes operating system 408 specific for managing the device as it relates to personalized sound management and allows user control to adjust the parameters of each application for their specific needs.

Hardware 402 can be integrated into existing devices or next generation devices for adding utility, providing safety, and allowing personalization of a user's acoustic space. Providing hardware 402 enables device manufacturers 410 to rapidly integrate the technology into their products. This will quicken the adoption cycle of the technology for the benefit of the general public in health and safety, and for the individual through personalization. Hardware 402 can be a circuit board to which transducers 404 and H-Chip™ 406 are operatively attached.

Device manufacturers 410 can provide their own hardware 414 or use transducers 404 and H-Chip™ 406. The operating system and application software is incorporated 412 and stored in read only memory (ROM). In at least one exemplary embodiment, operating system 408 and the application software can be stored in ROM. Using read only memory for storage prevents device manufacturers 410 or consumers from tampering with the software code thereby maintaining the integrity of the system and how it performs for the user. Note herein when referring to ROM storage, at least one exemplary embodiment can include RAM or other read/write storage methods.

People in the consumer product industry have stated that any new product and even old products in the hands of consumers may produce liability issues that companies associated with the product have to deal with. This often delays an introduction of a product or adds substantial cost to a product launch. In at least one exemplary embodiment, device manufacturers 410 provide their product for certification 416. In at least one exemplary embodiment, certification 416 is performed by an independent company from device manufacturers 410. Certification 416 is a process whereby a new product is exhaustively tested to ensure the device will perform to specification under a variety of conditions and tolerances. In particular, certification 416 tests the operating system and the device performance in implementing the applications related to personal sound management. Should the device not pass certification testing, it can be repaired or redesigned. The repaired or redesigned device can then undergo certification 416 to determine if it meets the test specifications.

In at least one exemplary embodiment, an insurance policy 418 may be provided covering the device manufacturers 410 using operating system 408, hardware 402, and the application software. This provides substantial benefits in that the device manufacturers 410 can deploy the technology with less risk. Moreover, each company providing devices will know that the personalized sound management system is similar or identical to others in the market. As mentioned hereinabove, the operating system and application software can be stored in ROM ensuring it cannot be rewritten. Additional measures can be taken to determine if the software is being used out of context and shutting down the operation of the device.

Once tested and certified, device manufacturers 410 can manufacture, market, and sell devices with personalized sound management 424 and be covered from a liability perspective under provisions in the insurance policy 418. A consumer purchases 420 a certified device and may also be covered under the same insurance policy 418 or may have a second policy directed to the consumer. Consumer protected 422 under insurance policy 418 and having certification 416 will instill consumer confidence to the quality and reliability of the device. This will be discussed in greater detail hereinbelow. Thus, this process is very efficient in creating manufacturer adoption of the personalized sound management technology while protecting both device manufacturers 410 and the consumer.

Figure 5:
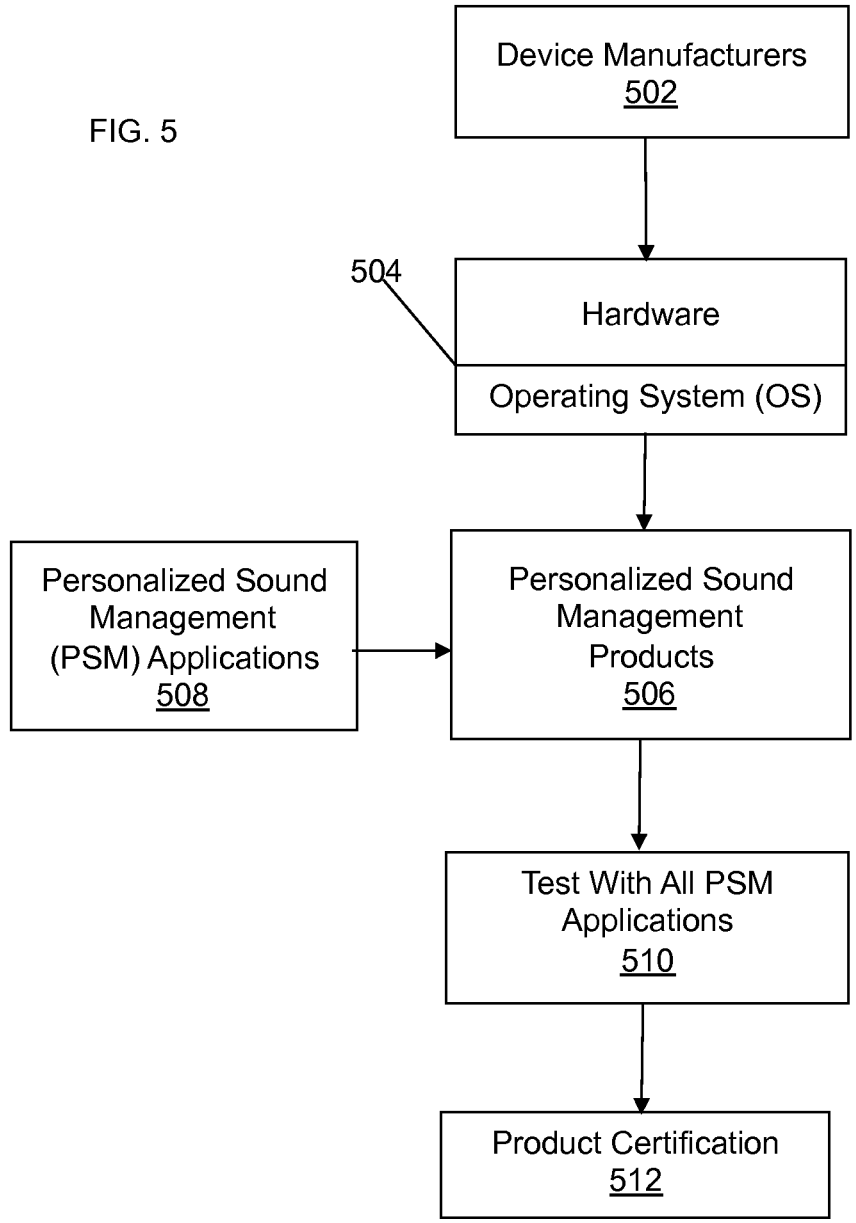
FIG. 5 illustrates a flow chart of an application testing in accordance with at least one exemplary embodiment.

FIG. 5 is a diagram illustrating application testing in accordance with at least one exemplary embodiment. Device manufacturers 502 develop, prototype, and manufacture products 506. Products 506 include hardware and operating system 504 for running and performing Personalized Sound Management (PSM™) applications 508.

In at least one exemplary embodiment, hardware and operating system 504 is capable of running all personalized sound management applications 508. Products 506 may or may not use all of personalized sound management applications 508. Similarly, an end user or customer of products 506 may or may not use all of personalized sound management applications 508.

Hardware and operating system 504 of products 506 are loaded with all personalized sound management applications 508. The hardware and operating system 504 are exercised in testing 510 to ensure that it can run personalized sound management applications 508 per specification. Product 506 may or may not be tested for all personalized sound management applications 508 depending on the capability of the device. Products 506 will be tested 510 for the implementation of all personalized sound management applications it is capable of running to meet user specifications for the product (i.e. product certification 512). In at least one exemplary embodiment, should a product run only a subset of personalized sound management applications, the product can be designed and tested to lock out the running of applications not specified for the particular product (even though hardware and operating system 504 can run personalized sound management applications 508).

A scale of economy for developing and manufacturing hardware and operating system 504 is achieved by having a number of different device manufacturers 502 standardize on the engine (hardware and operating system 504) for implementing personalized sound management. Consistency of product, ability to expand scope of product, and lowering cost through volume manufacturing are all achieved by this methodology. In the example where liability insurance may be purchased by the product certification company (or other company) testing 510 all personalized sound management applications 508 in products 506 ensures that hardware and operating system 504 perform per specification independent of the product it is placed in. Furthermore, having little or no variation on the operation of hardware and operating system 504 and personalized sound management applications 508 minimizes risk. An added benefit is that a large statistical database of diversified products is generated that will allow improvements to managing personalized sound management devices to improved device performance as well as lower liability risk. The consumer benefits by having a highly exercised and stable product that improves their health, safety, and quality of life.

Figure 6:
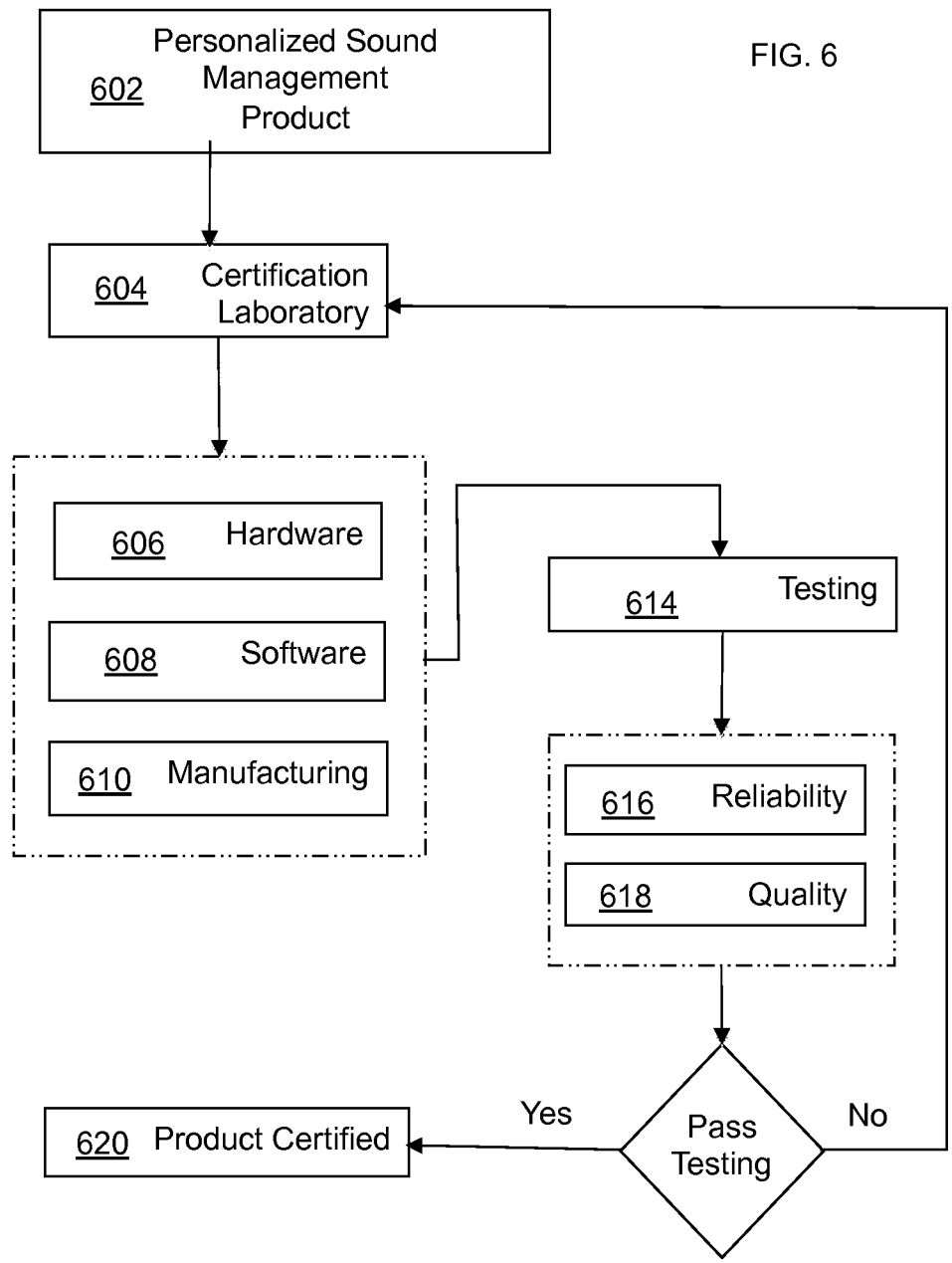
FIG. 6 illustrates a flow chart of the testing of a personal sound management device in accordance with at least one exemplary embodiment.

FIG. 6 is a diagram illustrating testing of a personalized sound management product 602 in accordance with at least one exemplary embodiment. In at least one exemplary embodiment, testing of all products incorporating personalized sound management applications are tested by a single entity. Personalized sound management product 602 can be developed and manufactured by a number of different companies. As previously mentioned, this allows the single entity, should it so desire to purchase a liability insurance policy that covers the manufacturers making personalized sound management product 602 and consumers using personalized sound management product 602.

Personalized sound management product 602 is tested by certification laboratory 604. In at least one exemplary embodiment, certification laboratory 604 is independent from the different manufacturers that develop personalized sound management product 602 thereby providing unbiased testing. Testing 614 of hardware 606, software 608, and manufacturing 610 are performed on personalized sound management product 602. Testing 614 is related to operation and performance of personalized sound management applications. Hardware testing includes the processor, transducers, and other elements, which implement the personalized sound management of the device. Testing of software 608 includes the operating system and personalized sound management applications. Testing 614 includes reliability 616 and quality 618 testing. Testing 614 can also include human testing because in some embodiments, personalized sound management product may be worn in an orifice of the human body.

Upon passing testing 614 the personalized sound management product 602 is certified by certification laboratory 604. A product certified 620 can include some form of warranty, indemnification, and liability insurance for the device. Problems or issues with personalized sound management product 602 are reported to the company should it fail for any reasons. Corrective action can be taken and the device retested to determine if the issue has been resolved.

In at least one exemplary embodiment, certification laboratory 604 or its parent company will brand the product by placing a trademark or company logo on the approved personalized sound management product 602. The trademark or logo represents the incorporation of its personalized sound management technology in the product (hardware, software, and intellectual property) as well as the certification indicating the quality and reliability of the device.

FIG. 7a is a diagram illustrating a consumer purchase process for a personalized sound management product in accordance with at least one exemplary embodiment. A consumer reviews a number of different devices such as earpieces in a display area. The display area allows the consumer to look, feel, and touch the hardware. The consumer focuses on an earpiece 701 in the display area and wants to learn more about the device.

A sales person can demonstrate earpiece 701 allowing the consumer to test the functions and performance of the device. A demonstration room or test environment can be used to illustrate performance differentiation when compared to other earpieces. In at least one exemplary embodiment, earpiece 701 is an in-ear device that has a removable and disposable sealing section. This allows consumer testing using earpiece 701 while maintaining a sanitary condition by disposing of the sealing section after each test session.

The consumer indicates to the sales person that he or she would like to purchase earpiece 701. The sales person accesses a computer that is coupled to server system for completing a purchase transaction. The consumer provides registration information that is entered into a database in a step 703. The consumer or the sales person can enter the information into the database. The registration information 705 comprises information such as personal, financial, business, and preference. Personal information relates to data such as age, sex, home address, telephone number, email address, which identifies the consumer. Financial information relates the consumer's ability to pay such as credit history, credit card for billing, job information, and banking institutions. Business information relates to a business purchase of the component. Similar to above, business identification and business financial information would be entered with the purchase. Preferences relate to things such as how the consumer wants to be contacted (email, phone), do they want to be made aware of upgrades for their device, and other products they might have interest in. Other information or user experiences could also be collected during the registration process.

The unit selected by the consumer is then entered into the system in a step 707. In at least one exemplary embodiment, the system identifies the unit and provides a listing of the hardware, software, and subsystems that work with the earpiece 701. The consumer can look at the options available in a step 709 and select among these options. In at least one exemplary embodiment, the selection process can be facilitated by topic, occupation, or other characteristics by providing a list of typical user features applied to earpiece 701. For example, the consumer is purchasing earpiece 701 for a multimedia player. Earpiece 701 provides a substantial improvement in noise attenuation, musical clarity, definition, and dynamic range. The consumer is interested in the safety aspect (and selects this topic on the kiosk) provided by earpiece 701 in alerting the user to an emergency event. For example, earpiece 701 can detect and make the user aware of sirens, emergency sounds, alarms, etc. that would be difficult to hear when listening to music. The consumer by looking at the "safety" topic can select appropriate applications software and sonic signatures to alert the user of a safety situation for their specific device. The consumer can continue to look through other topics and select hardware and software that supplements and implements the desired user experience.

As mentioned previously, the options can be provided in a step 709 in many different formats. Another format of providing options is by occupation. For example, a dentist may be provided a package to outfit the entire office and patients. The earpieces substantially reduce noise related to drilling which are both a psychological barrier for dentistry and a hearing loss mechanism for people working in a dentist office. The occupation package can provide wireless communication between devices allowing dentists, assistants, and patients to talk or listen to music even in a noisy environment. Replaceable in-ear sealing sections would allow the staff to maintain sanitary conditions with each new patient. After reviewing the consumer selects the appropriate hardware and software to personalize their sound space (on the kiosk or computer) in a step 711.

In at least one exemplary embodiment, the selected application software provided to earpiece 701 is a subscription whereby the consumer pays a monthly fee to use the applications. Alternately, the selected application software can be a license or purchase associated with the earpiece 701 whereby a one time fee is paid. The consumer can discuss the terms of the agreement with the sales person or review the contract on the computer. If the consumer approves, the contract is signed or accepted and an initial payment is made for the hardware and software in a step 713. The consumer can have the subscription payment automatically billed to a credit card or other automatic payment methodology to ensure uninterrupted service.

The purchased earpiece is then connected via a wired or wireless connection to download the selected software and enabled in a step 715. A wired connection 717 such as a mini USB cable is shown in the illustration. Wired connection 717 connects to a server system having the appropriate software. In at least one exemplary embodiment, the selections from step 711 can be stored in memory and used to direct the downloading of software to the device, verify the software can be used in the device, and that the appropriate software has been loaded.

Figure 7B:
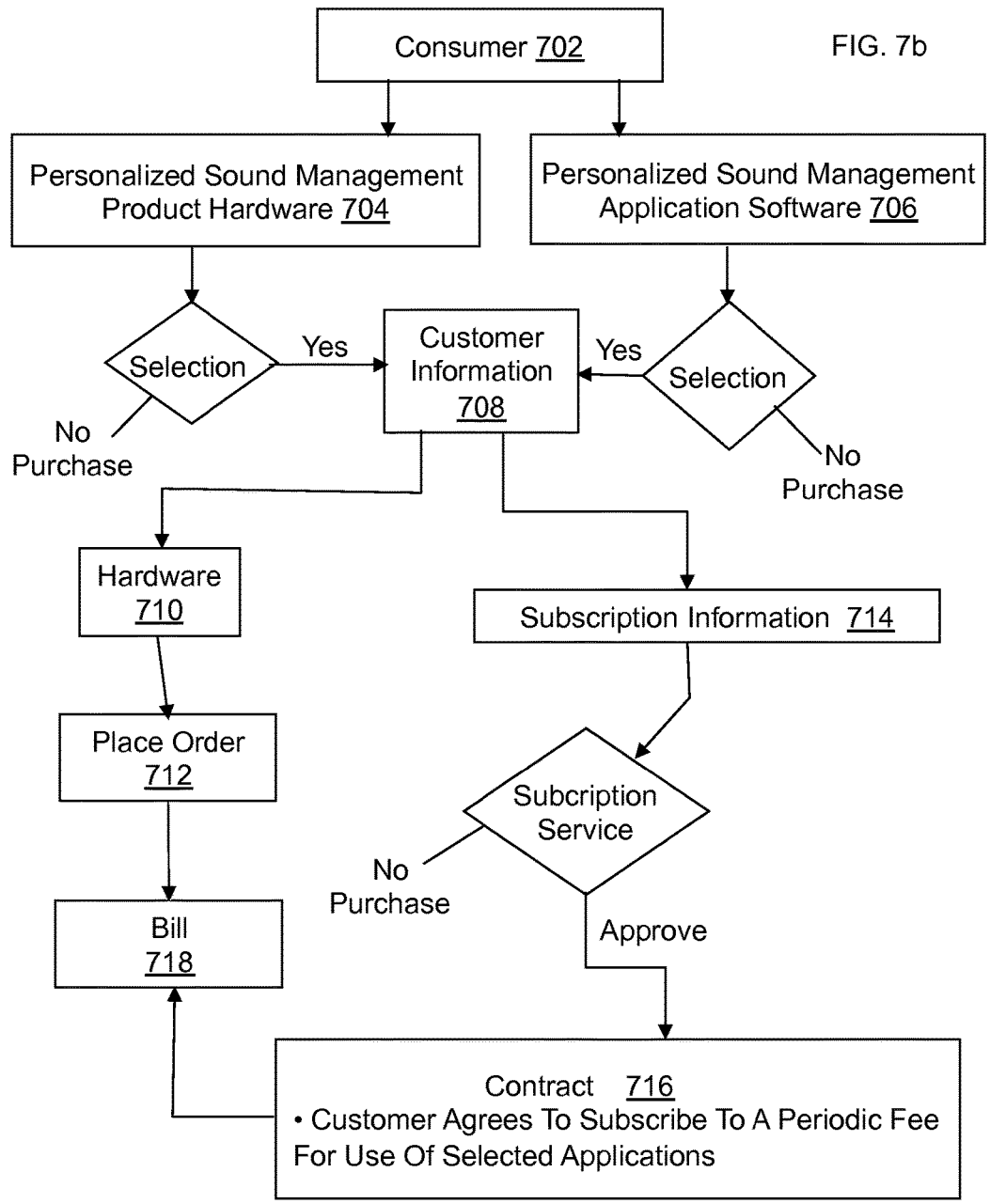

FIG. 7b is a diagram illustrating a consumer purchase process for a personalized sound management product in accordance with at least one exemplary embodiment. A consumer 702 can purchase personalized sound management product hardware 704 and personalized sound management application software 706. Software 706 works with hardware 704 to personalize and manage sound for consumer 702 for providing utility, safety, and health benefits.

Hardware 704 can range from a complete product such as a communication device, sound device, or earpiece to ancillary components for enhancing the look of the device or adding further hardware features. In the event that consumer 702 purchases hardware 704, customer information 708 is required to continue with purchase. In general, customer name, address, personal information and financial information are typically required to purchase hardware 704. Other information can also be collected through a questionnaire or some form of incentive. Should customer information 708 exist and consumer 702 is in good stead then generating customer information 708 is not required and the order process continues. Any issue that occurs in checking customer information 708 will be brought up for rectification to consumer 702. The hardware 710 that consumer 702 selected is verified and place order 712 is performed.

Personalized sound management application software 706 is a suite of applications that consumer 702 selects for their specific needs. Once customer information 708 has been established, consumer 708 is provided subscription information 714. Use of personalized sound management application software 706 is based on a periodic fee or subscription (for example, a monthly fee). Subscription information 714 informs consumer 702 as to the periodic subscription fees associated with the software 706, terms of use, bundled packages of applications, and other pertinent information to complete the decision process. Should consumer 702 approve of the terms, a contract 716 is provided to the customer to accept or decline. A bill 718 is generated when an order is placed either through purchasing hardware 710, accepting a subscription to personalized sound management application software 706, or both. In at least one exemplary embodiment, the purchase process is web based allowing consumer 702 to purchase from a client system via a communication path such as the internet or communication network.

Figure 8:
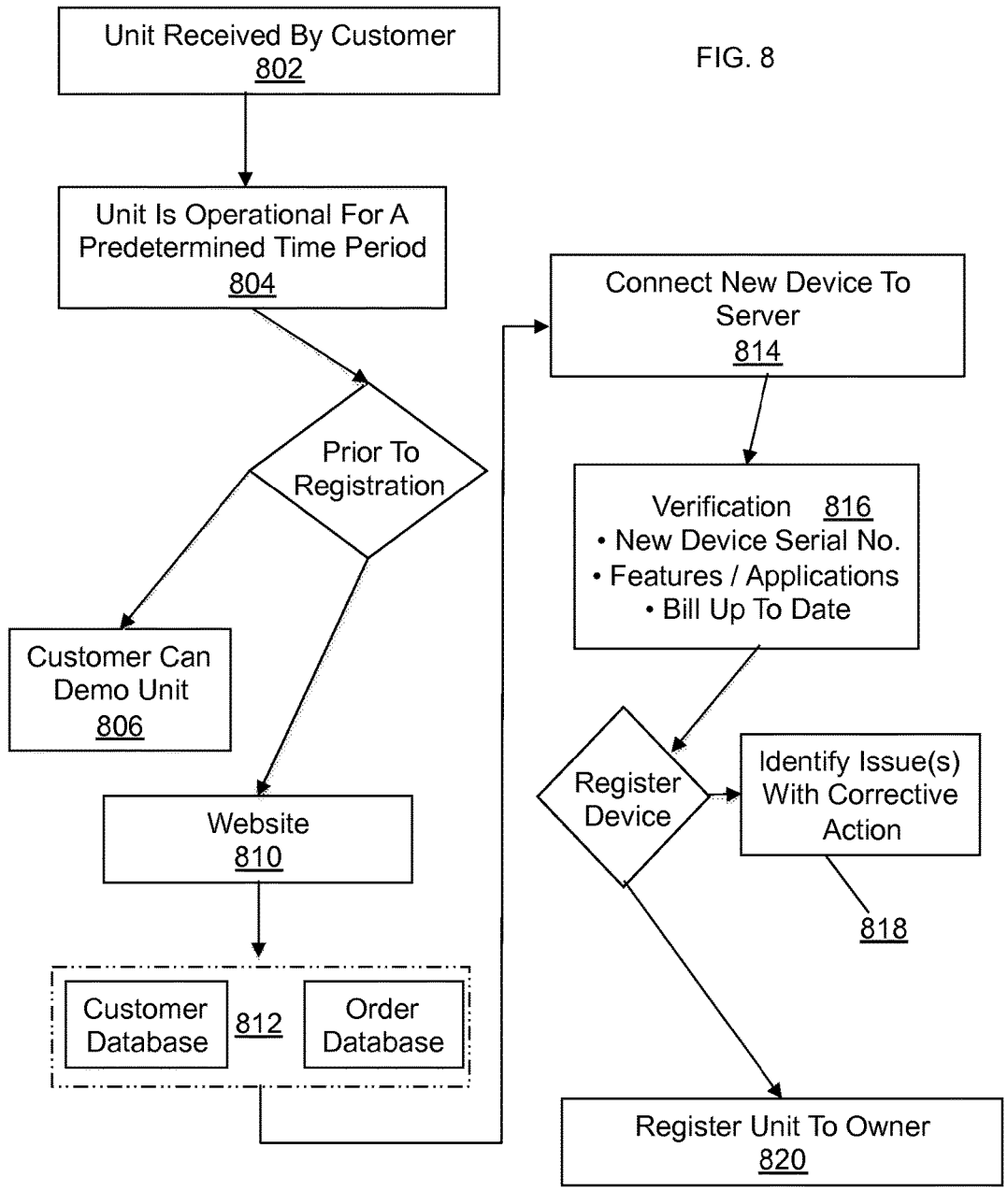
FIG. 8 illustrates a flow chart of registering a new device that includes personalized sound management applications in accordance with at least one exemplary embodiment.

FIG. 8 is a diagram illustrating registering a new device that includes personalized sound management applications in accordance with at least one exemplary embodiment. A new device or unit is received by a customer 802. The manufacturer has loaded the preordered personalized sound management applications chosen by customer 802 into the unit. Typically, customer 802 is going to want to try the unit shortly after receiving it (e.g., the unit is operational for a predetermined period of time 804, for example 1 week). In at least one exemplary embodiment, customer 802 can try the unit for a predetermined time period 804. In general, the time period 804 (for example, 15-30 minutes) is long enough for customer 802 to get a feel for the unit but is not a useful length of time. Furthermore, the unit will notify customer 802 through a transducer on the unit that they must register the device and that the unit will not be usable after the predetermined time period. Note that in at least one exemplary embodiment the customer would have the opportunity to demo certain features (806) not purchased.

In at least one exemplary embodiment, a website 810 is a portal to register the unit purchased by customer 802. Website 810 can have a web page devoted to registering new devices to simplify the process. Customer 802 may log in (if an account already exists) or provide personal information related to the registering process. A database 812 is accessed that includes both customer and order information in one or more databases. In at least one exemplary embodiment, the unit is in communication with the device manufacturer server 814 through website 810 or coupled thereto through a customer system.

Verification 816 verifies that all information is correct and that there are no pending issues 818 with a corrective action identified. The verification process 816 can checks things like device serial number, features and applications ordered by customer 802, personal/financial information. Once verification 816 is complete, it is determined at step 817 whether to register the device. Step 817 proceeds to step 820 if there are no pending issues 818. Registration 820 registers the unit to the owner after verification 816 is complete.

Figure 9:
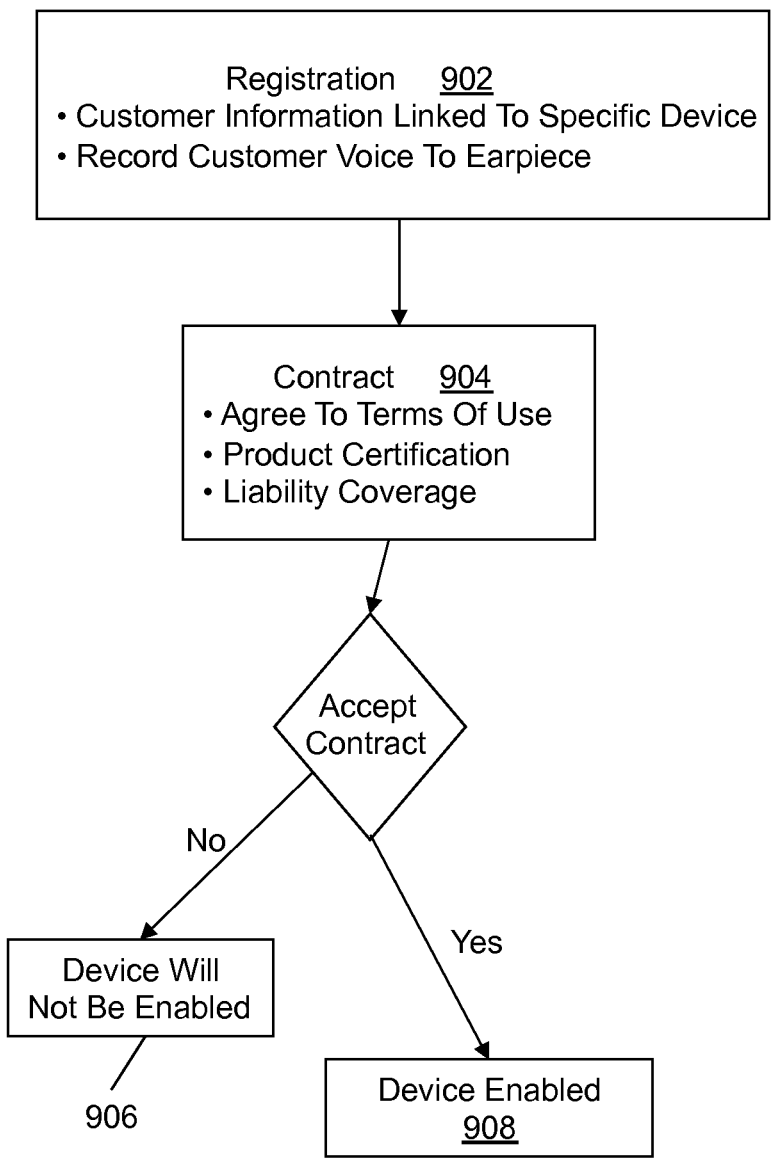
FIG. 9 illustrates a flow chart of enabling the new device in accordance with at least one exemplary embodiment.

FIG. 9 is a diagram illustrating enabling a device in accordance with at least one exemplary embodiment. In general, registration 902 links customer information to a device as disclosed in FIG. 8. The registration process includes a comprehensive legally-compliant, state-specific Informed Consent system for collecting and storing the Informed Consent of users.

In at least one exemplary embodiment, the device will have at least one microphone. In the process of registration 902 the customer voice is recorded by the device. The customer voice can be stored on the device and to the customer database. The customer voice can be used for a number of applications including voice verification to use the device thereby acting as a deterrent for others to use or steal the device.

As mentioned in FIG. 8 the unit or device can be enabled for a predetermined time period. Prior to enabling the new device, a contract 904 is provided for customer review. The contract outlines the terms of use for using the device and that the product had been certified through a rigorous testing process. In at least one exemplary embodiment, liability coverage may be provided to the customer if the contract is accepted. Having the liability coverage in conjunction with the certification process is powerful in building consumer confidence about personalized sound management.

At step 905, it is determined whether the contract is accepted. The new device is not enabled 906 if the customer does not accept contract 904. The new device is enabled 908 if the customer accepts contract 904. In at least one exemplary embodiment, the registration and enabling of the unit is through a client system coupled to the business server. Thus, the unit is enabled remotely.

Figure 10:
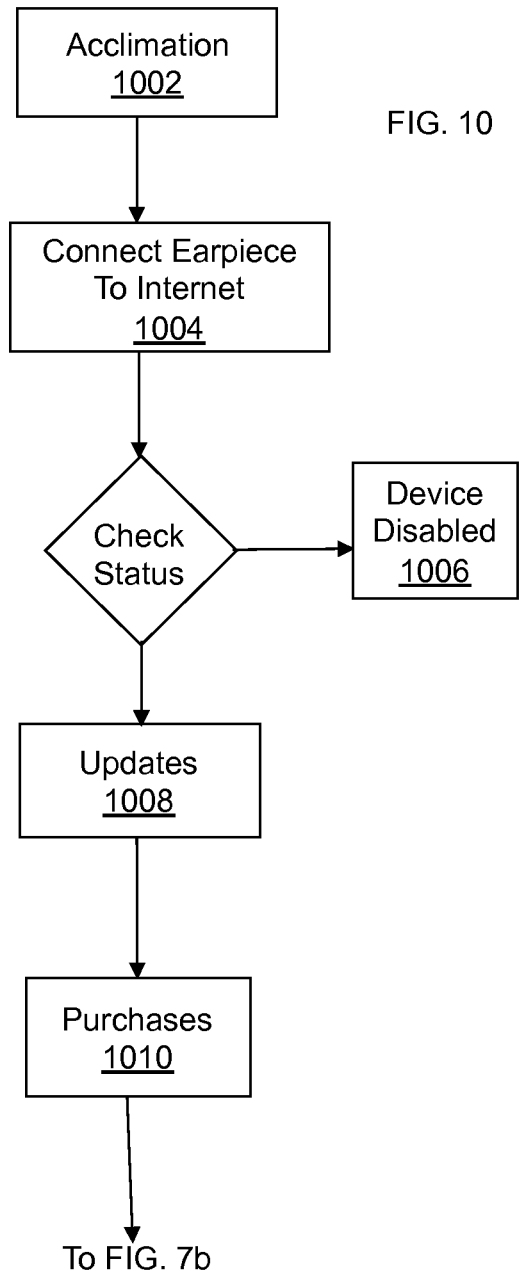
FIG. 10 illustrates a flow chart of updating a unit or device in accordance with at least one exemplary embodiment.

FIG. 10 is a diagram illustrating updating a unit or device in accordance with at least one exemplary embodiment. The device is enabled for use. In general, instructions or an operational video may be provided for a user to get acquainted with the device. Even with this help, a device may have so many features and applications that the user could get overwhelmed or frustrated trying to understand and operate the unit. In some cases, a user may not want even try to learn how to operate all the features and initially start out with the application that provides significant utility to the user. The user may never address learning how to use all the capabilities of the device. Moreover, misuse of a device can lead to dangerous operating conditions that could cause a serious or harmful situation.

Acclimation 1002 is a process to ensure that a user of a device appreciates the entire feature set but more particularly, enables the features in a way that ensures proper usage in a safe and structured manner. In at least one exemplary embodiment, acclimation 1002 comprises two components, a learning module and a reminder module. The learning module is a system that "teaches" the user of the device the functional components of the device. In at least one exemplary embodiment, the learning module may incorporate a learning system that evaluates the user in the domain of a particular competency before certain functions or features of the device are enabled. For example, features of the device are enabled sequentially, either automatically after the user has utilized a particular function for a predetermined time (thereby showing competency in using the feature) or following a user competency evaluation, which can be invoked either manually (when the user is confident in using the feature) or automatically.

The reminder module may or may not be used in acclimation 1002. The reminder serves to remind the user of the correct usage of features and also serves to remind the user of other features on the device which the user may not have used in a given time period. In at least one exemplary embodiment an evaluation is invoked based on a predetermined time period. The evaluation may be for a single function or feature or a combination of different functions. The predetermined time period before evaluating can vary depending on the function. Alternatively, the evaluation may be invoked based on a particular recent event, such as a software upgrade, or a detected change in user usage. If the user passes the evaluation, the evaluation may be repeated, the relevant learning mode for the corresponding function to which the users competency was evaluated may be repeated, or the corresponding function to which the users competency was evaluated may be disabled. Thus, acclimation 1002 allows a user to learn the device at a friendly pace, ensures that the user does know how to use a feature, and protects the user from using the device in a manner that could be harmful.

The device can be coupled 1004 from a client system to the business server to update software on the device or purchase new hardware and software. As disclosed hereinabove, the user information is checked to determine if there are any issues that need to be rectified (e.g. missed payment, user does not match to device, etc. . . . ). In the event that the issues cannot be rectified the device is disabled in a step 1006. In at least one exemplary embodiment, the user information, device, and personalized sound management applications correlate. The server checks for updates 1008 for the device and downloads updates to the device. The user goes through a similar process as described in FIGS. 7A-7B for a hardware or software purchase 1010 including agreeing to a contract to subscribe and contract to terms of use as described in FIG. 9.

Figure 11:
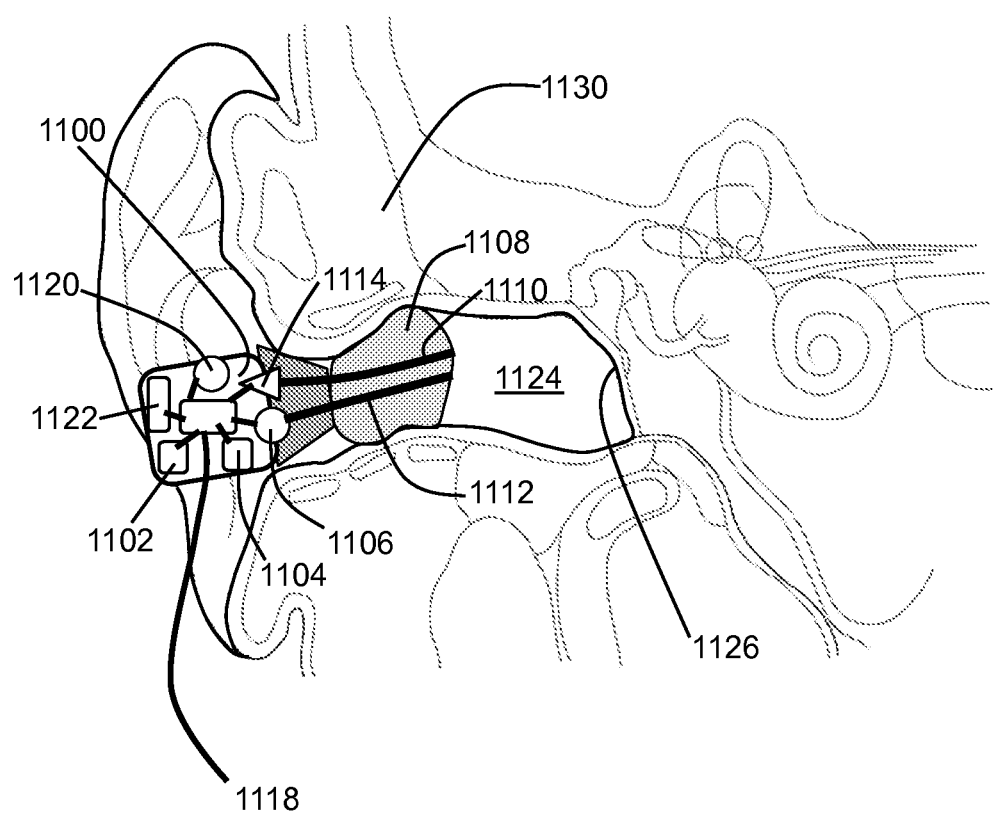
FIG. 11 illustrates a diagram of a device for implementing personalized sound management in accordance with at least one exemplary embodiment.

FIG. 11 is a diagram illustrating a device for implementing personalized sound management in accordance with at least one exemplary embodiment. The device is generally indicated as an earpiece that partially seals or seals a user's ear canal 1124 and is constructed and operates in accordance with at least one exemplary embodiment of the invention. As illustrated, the earpiece comprises an electronic housing unit 1100 and a sealing unit 1108. The earpiece depicts an electro-acoustical assembly for an in-the-ear acoustic assembly, as it would typically be placed in an ear canal 1124 of a user 1130. The earpiece can be an in the ear earpiece, behind the ear earpiece, receiver in the ear, partial-fit device, or any other suitable earpiece type. The earpiece can partially or fully occlude ear canal 1124, and is suitable for use with users having healthy or abnormal auditory functioning.

The earpiece includes an Ambient Sound Microphone (ASM) 1120 to capture ambient sound, an Ear Canal Receiver (ECR) 1114 to deliver audio to an ear canal 1124, and an Ear Canal Microphone (ECM) 1106 to capture and assess a sound exposure level within the ear canal 1124. The earpiece can partially or fully occlude the ear canal 1124 to provide various degrees of acoustic isolation. In at least one exemplary embodiment, the assembly is designed to be inserted into the user's ear canal 1124, and to form an acoustic seal with the walls of the ear canal 1124 at a location between the entrance to the ear canal 1124 and the tympanic membrane 1126 (or ear drum). In general, such a seal is typically achieved by means of a soft and compliant housing of sealing unit 1108.

Sealing unit 1108 is an acoustic barrier having a first side corresponding to ear canal 1124 and a second side corresponding to the ambient environment. In at least one exemplary embodiment, sealing unit 1108 includes an ear canal microphone tube 1112 and an ear canal receiver tube 1110. Sealing unit 1108 creates a closed cavity of approximately 5 cc between the first side of sealing unit 1108 and the tympanic membrane 1126 in ear canal 1124. As a result of this sealing, the ECR (speaker) 1114 is able to generate a full range bass response when reproducing sounds for the user. This seal also serves to significantly reduce the sound pressure level at the user's eardrum 1126 resulting from the sound field at the entrance to the ear canal 1124. This seal is also a basis for a sound isolating performance of the electro-acoustic assembly.

In at least one exemplary embodiment and in broader context, the second side of sealing unit 1108 corresponds to the earpiece, electronic housing unit 1100, and ambient sound microphone 1120 that is exposed to the ambient environment. Ambient sound microphone 1120 receives ambient sound from the ambient environment around the user.

Electronic housing unit 1100 houses system components such as a microprocessor 1116, memory 1104, battery 1102, ECM 1106, ASM 1120, ECR 1114, and user interface 1122. Microprocessor 1116 (or processor 1116) can be a logic circuit, a digital signal processor, controller, or the like for performing calculations and operations for the earpiece. Microprocessor 1116 is operatively coupled to memory 1104, ECM 1106, ASM 1120, ECR 1114, and user interface 1122. A wire 1118 provides an external connection to the earpiece. Battery 1102 powers the circuits and transducers of the earpiece. Battery 1102 can be a rechargeable or replaceable battery.

In at least one exemplary embodiment, electronic housing unit 1100 is adjacent to sealing unit 1108. Openings in electronic housing unit 1100 receive ECM tube 1112 and ECR tube 1110 to respectively couple to ECM 1106 and ECR 1114. ECR tube 1110 and ECM tube 1112 acoustically couple signals to and from ear canal 1124. For example, ECR 1114 outputs an acoustic signal through ECR tube 1110 and into ear canal 1124 where it is received by the tympanic membrane 1126 of the user of the earpiece. Conversely, ECM 1106 receives an acoustic signal present in ear canal 1124 though ECM tube 1112. All transducers shown can receive or transmit audio signals to a processor 1116 that undertakes audio signal processing and provides a transceiver for audio via the wired (wire 1118) or a wireless communication path.

The earpiece can actively monitor a sound pressure level both inside and outside an ear canal 1124 and enhance spatial and timbral sound quality while maintaining supervision to ensure safe sound reproduction levels. The earpiece in various embodiments can conduct listening tests, filter sounds in the environment, monitor warning sounds in the environment, present notification based on identified warning sounds, maintain constant audio content to ambient sound levels, and filter sound in accordance with a Personalized Hearing Level (PHL).

The earpiece can generate an Ear Canal Transfer Function (ECTF) to model the ear canal 1124 using ECR 1114 and ECM 1106, as well as an Outer Ear Canal Transfer function (OETF) using ASM 1120. For instance, the ECR 1114 can deliver an impulse within the ear canal 1124 and generate the ECTF via cross correlation of the impulse with the impulse response of the ear canal 1124. The earpiece can also determine a sealing profile with the user's ear to compensate for any leakage. It also includes a Sound Pressure Level Dosimeter to estimate sound exposure and recovery times. This permits the earpiece to safely administer and monitor sound exposure to the ear.

In at least one exemplary embodiment, the earpiece has a number of sonic signatures stored in memory. ASM 1120 is providing acoustic information from the ambient environment to processor 1116. Processor 1116 analyses the acoustic information for a sound similar to the sonic signature. Once identified, the earpiece will provide a response to the sound based on the application. In a first exemplary embodiment, the earpiece will reduce music or telephone call (or the dominant source of sound being provided by the earpiece) and amplify the identified signal (ambulance or police car) thereby notifying the user of the approaching vehicle. In a second exemplary embodiment, the earpiece will tell the user (through a synthesized voice) that an ambulance or police car is approaching including the direction of the vehicle. The earpiece can also provide the identified signal with the voice warning. Other variations are possible.

Conversely, the earpiece can perform the opposite operation. The earpiece can identify a signal similar to the sonic signature and then attenuate it before providing it through ECR 1114. For example, the user of the earpiece is a gun enthusiast. The user downloads a sonic signature related to a gun shot. The earpiece upon identifying the sound of the gun shot would attenuate the portion of the acoustic information provided by ASM 1120 similar to the sonic signature of the gun shot while allowing other signals to come through. Thus, the user could engage in a conversation at the gun range with the gun shot sounds attenuated while passing the conversation through the earpiece thereby protecting his ear from the loud sounds in this environment and being able to hear the conversation with more clarity.

In at least one exemplary embodiment, the earpiece can manually or automatically record, measure sound pressure levels, attach metadata (including time stamp and geocode), and upload the information when a communication path is present to a sound database. The earpiece is capable of running personalized sound management software disclosed herein. Moreover, hardware ingredients such as the transducers (ECR 1114, ASM 1120, and ECM 1106), processor 1116, and sealing unit 1108 are provided to manufacturers as disclosed in FIG. 3 for allowing a variety of companies to manufacture devices of their own earpiece designs. It should be noted that although an earpiece is used as an example of a personalized sound management device the components can be used in other communication devices and sound devices to personalize control of the sound.

In at least one exemplary embodiment, sealing section 1108 is a replaceable unit. Sealing section 1108 can pull out and be replaced as a unit. Sealing section 1108 performance can degrade over time due to particulate build up. There may also be sanitary or health reasons for replacing sealing section 1108 periodically. In at least one exemplary embodiment, sealing section 1108 replacement parts can be provided as part of a periodic subscription fee to a user, purchased over the counter in a store, or purchased through a web environment.

Figure 12:
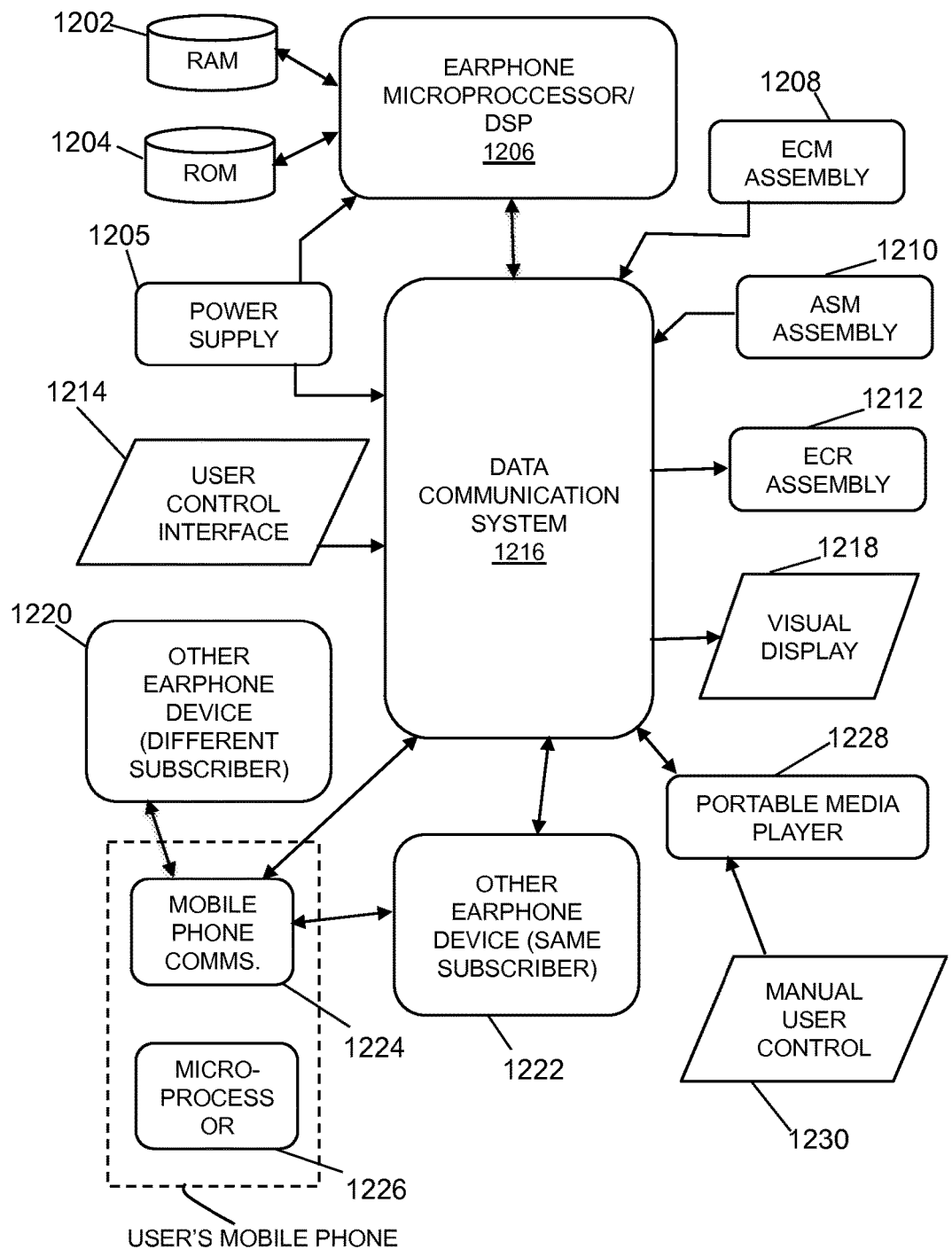
FIG. 12 illustrates a block diagram of a device for implementing personalized sound management in accordance with at least one exemplary embodiment.

FIG. 12 is a block diagram of a device for implementing personalized sound management in accordance with at least one exemplary embodiment. A power supply 1205 powers components of the earpiece including microprocessor/DSP 1206 (or processor 1206) and a data communication system 1216. As illustrated, the earpiece can include the processor 1206 operatively coupled through a data communication system 1216 to an ASM 1210, an ECR 1212, and ECM 1208. Data communication system 1216 can include one or more Analog to Digital Converters and Digital to Analog Converters (DAC). The processor 1206 can utilize computing technologies such as a microprocessor, Application Specific Integrated Chip (ASIC), and/or digital signal processor (DSP) with associated Random Access Memory (RAM) 1202 and Read Only Memory 1204. Other memory types such as Flash, non-volatile memory, SRAM, DRAM or other like technologies can be used for storage with processor 1206. The processor 1206 can also include a clock to record a time stamp.

In general, a data communication system 1216 is a communication pathway to components of the earpiece and components external to the earpiece. The communication link can be wired or wireless. In at least one exemplary embodiment, data communication system 1216 is configured to communicate with ECM assembly 1208, ASM assembly 1210, visual display 1218, and user control interface 1214 of the earpiece. As shown, user control interface 1214 can be wired or wirelessly connected. In at least one exemplary embodiment, data communication system 1216 is capable of communication to devices exterior to the earpiece such as the user's mobile phone 1232, a second earpiece 1222, and a portable media player 1228. Portable media player 1228 can be controlled by a manual user control 1230.

The user's mobile phone includes a mobile phone 1232 communication system 1224. A microprocessor 1226 is operatively coupled to mobile phone communication system 1224. As illustrated multiple devices can be wirelessly connected to one another such as an earpiece 1220 worn by another person to the user's mobile phone 1232. Similarly, the user's mobile phone 1232 can be connected to the data communication system 1216 of the earpiece as well as the second earpiece 1222. This connection would allow one or more people to listen and respond to a call on the user's mobile phone 1232 through their respective earpieces.

As illustrated, a data communication system 1216 can include a voice operated control (VOX) module to provide voice control to one or more subsystems, such as a voice recognition system, a voice dictation system, a voice recorder, or any other voice related processor. The VOX module can also serve as a switch to indicate to the subsystem a presence of spoken voice and a voice activity level of the spoken voice. The VOX can be a hardware component implemented by discrete or analog electronic components or a software component. In one arrangement, the processor 1206 can provide functionality of the VOX by way of software, such as program code, assembly language, or machine language.

ROM 1204 can be used to store personalized sound management applications to minimize the possibility of modification and tampering of the code. The RAM 1202 can also store program instructions for execution on the processor 1206 as well as captured audio processing data. For instance, memory RAM 1202 and ROM 1204 can be off-chip and external to the processor 1206 and include a data buffer to temporarily capture the ambient sound and the internal sound, and a storage memory to save from the data buffer the recent portion of the history in a compressed format responsive to a directive by the processor. The data buffer can be a circular buffer that temporarily stores audio sound at a current time point to a previous time point. It should also be noted that the data buffer can in one configuration reside on the processor 1206 to provide high speed data access. The storage memory can be non-volatile memory such as SRAM to store captured or compressed audio data. The non-volatile memory could also be used to store sonic signatures.

Data communication system 1216 can include an audio interface operatively coupled to the processor 1206 and the VOX to receive audio content, for example from portable media player 1228, cell phone 1232, or any other communication device, and deliver the audio content to the processor 1206. The processor 1206 responsive to detecting voice-operated events from the VOX can adjust the audio content delivered to the ear canal of the user of the earpiece. For instance, the processor 1206 (or the VOX of data communication system 1216) can lower a volume of the audio content responsive to detecting an event such as a sonic signature for transmitting the acute sound to the ear canal of the user. The processor 1206 by way of the ECM 1208 can also actively monitor the sound exposure level inside the ear canal and adjust the audio to within a safe and subjectively optimized listening level range based on voice operating decisions made by the VOX of data communication system 1216.

The earpiece and data communication system 1216 can further include a transceiver that can support singly or in combination any number of wireless access technologies including without limitation Bluetooth™, Wireless Fidelity (WiFi), Worldwide Interoperability for Microwave Access (WiMAX), and/or other short or long range communication protocols. The transceiver can also provide support for dynamic downloading and uploading over-the-air to the earpiece. It should be noted also that next generation access technologies also can be applied to the present disclosure.

Data communication system 1216 can also include a location receiver that utilizes common technology such as a common GPS (Global Positioning System) receiver that can intercept satellite signals and therefrom determine a location fix of the earpiece and provide a geocode as an identifier for a recording or measurement such as sound pressure level.

The power supply 1205 can utilize common power management technologies such as replaceable batteries, supply regulation technologies, and charging system technologies for supplying energy to the components of the earpiece and to facilitate portable applications. A motor (not shown) can be a single supply motor driver coupled to the power supply 1205 to improve sensory input via haptic vibration. As an example, the processor 1206 can direct the motor to vibrate responsive to an action, such as a detection of a warning sound or an incoming voice call.

The earpiece can further represent a single operational device or a family of devices configured in a master-slave arrangement, for example, a mobile device and an earpiece. In the latter embodiment, the components of the earpiece can be reused in different form factors for the master and slave devices.

Figure 13:
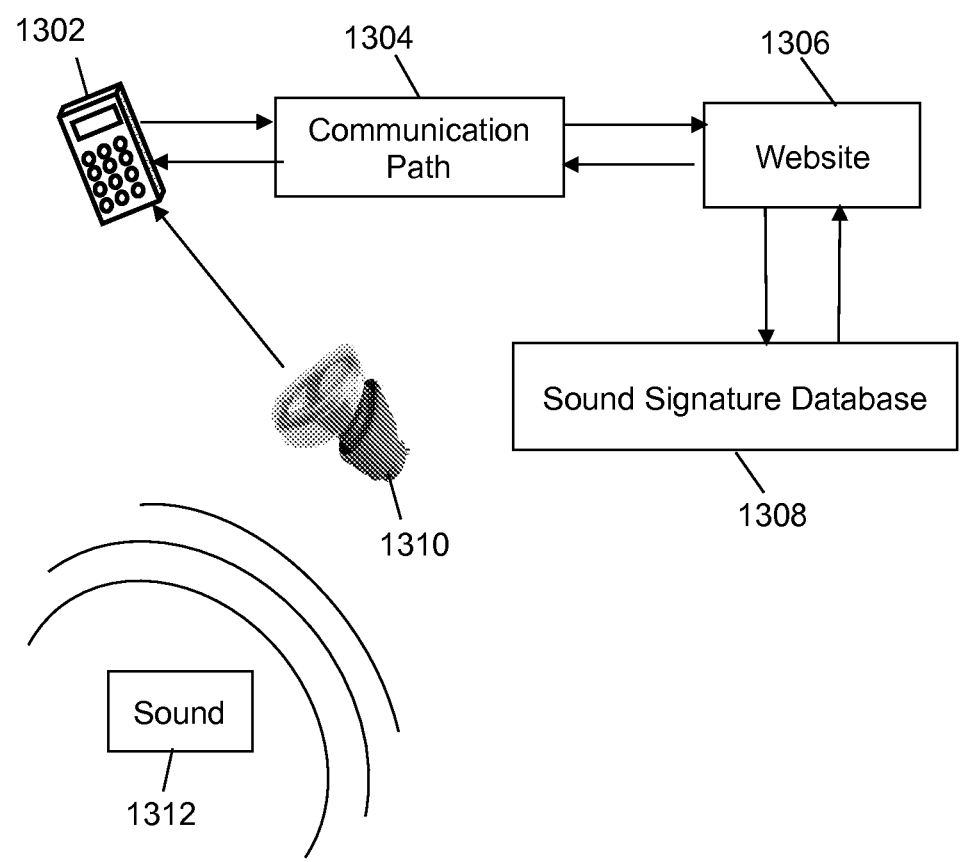
FIG. 13 illustrates a diagram of a communication device or earpiece configured to provide sonic signatures to a sonic signature database in accordance with at least one exemplary embodiment.

FIG. 13 is a diagram of a communication device 1302 or earpiece 1310 configured to provide sonic signatures to sonic signature database 1308 in accordance with at least one exemplary embodiment. Collecting a large number of sounds around the world is a daunting task. As mentioned previously, no group or business entity would have the ability to acoustically map the world on a continuous basis. In at least one exemplary embodiment, the collection of sonic signatures is achieved by mobilizing as many people as possible by making it simple to capture and provide a sound for sonic signature database 1308. This is achieved by adapting a common device having a potential of reaching billions of people for manually or automatically capturing sonic signatures and providing them to database 1308.

In at least one exemplary embodiment, communication device 1302 is a mobile communication device having a microphone for receiving sound. Examples of a communication device 1302 are a phone, cell phone, PDA, computer, two way radio, smart phone, and earpiece. Earpiece 1310 includes a microphone for capturing sound and the circuitry disclosed in FIG. 12. Earpiece 1310 is operably configured for recording sound and measuring sound pressure levels. The acoustic information received from the microphone of earpiece 1310 is recorded to memory residing in earpiece 1310 and tagged with metadata including a time stamp and geocode. The sound pressure level (SPL) is measured from the microphone signal through analog or digital signal processing typically before any audio processing occurs within earpiece 1310. The SPL measurement of this recorded event is associated to the stored recording and metadata. Similarly, communication device 1302 is adapted for capturing sound 1312 including recording, measuring sound pressure level, storing, and tagging with metadata (including a time stamp and geocode). In at least one embodiment, communication device 1302 could have additional circuitry similar to that in FIG. 12 in the device specifically for generating a sonic signature database. Alternately, the circuitry within communication device 1302 can be adapted for recording sound and measuring sound pressure level. In particular, mechanical aspects of the communication device such as microphone placement, microphone porting, as well as electronic audio processing (automatic gain control, equalization, etc. . . . ) is taken into account for ensuring an accurate sound pressure level measurement and recording.

In at least one exemplary embodiment, a user having communication device 1302 manually or automatically captures and provides a sonic signature to a sonic signature database 1308. For example, a microphone on communication device 1302 is always enabled for receiving sound. The sound can be stored in a buffer. The sound in the buffer is analyzed and based on a variety of criteria can be configured to be provided to database 1308. For example, criteria such as sound pressure level, time, frequency of sound, geographic location, or recognition of a sound (sonic signature detection) are but a few of the parameters that could be used to determine that the sound in the buffer is worthy of saving. Metadata is automatically attached such as a time stamp and geocode but the user can also add information. In at least one exemplary embodiment, a communication path 1304 is opened and a link is made to website 1306 and more particularly to database 1308 where the stored sounds can be automatically uploaded. In at least one exemplary embodiment, the sonic signature, sound pressure level, and metadata could be immediately sent if a communication path 1304 is available to save memory. Further communication between website 1308 and the user of communication device 1302 or earpiece 1310 can take place to edit, identify, describe, and format the provided sound 1312 at a more convenient time. It should be noted that video information that includes audio information can also be provided in similar fashion as disclosed hereinabove. The audio information from the video can be used for sonic signature database 1308.

Earpiece 1310 and communication device 1302 can be operably coupled together. A priority could be set up such that earpiece 1310 is the primary recorder of sound 1312 when enabled by the user. Earpiece 1310 can be used with other devices for example a portable media player. Earpiece 1310 can automatically or manually record, measure SPL, and tag metadata of sound 1312 as described hereinabove. The sonic signatures stored in earpiece 1310 could be sent to website 1306 and sonic signature database 1308 if earpiece 1310 is coupled to a communication path 1304 or through another device to which it is operably coupled that has a communication path. Alternately, the sonic signatures could be uploaded via website 1306 and sonic signature database 1308 at a more convenient time, for example a wired or wireless link to the user's personal computer at home, allowing the user to also provide additional metadata before providing the information. Thus, a common device has been provided that is adapted for capturing, storing, measuring SPL, adding metadata including a time stamp and geocode, and uploading the acoustic information to a database thereby including the broadest number of people across the largest geographic area for sound collection on a continuous basis.

Figure 14:
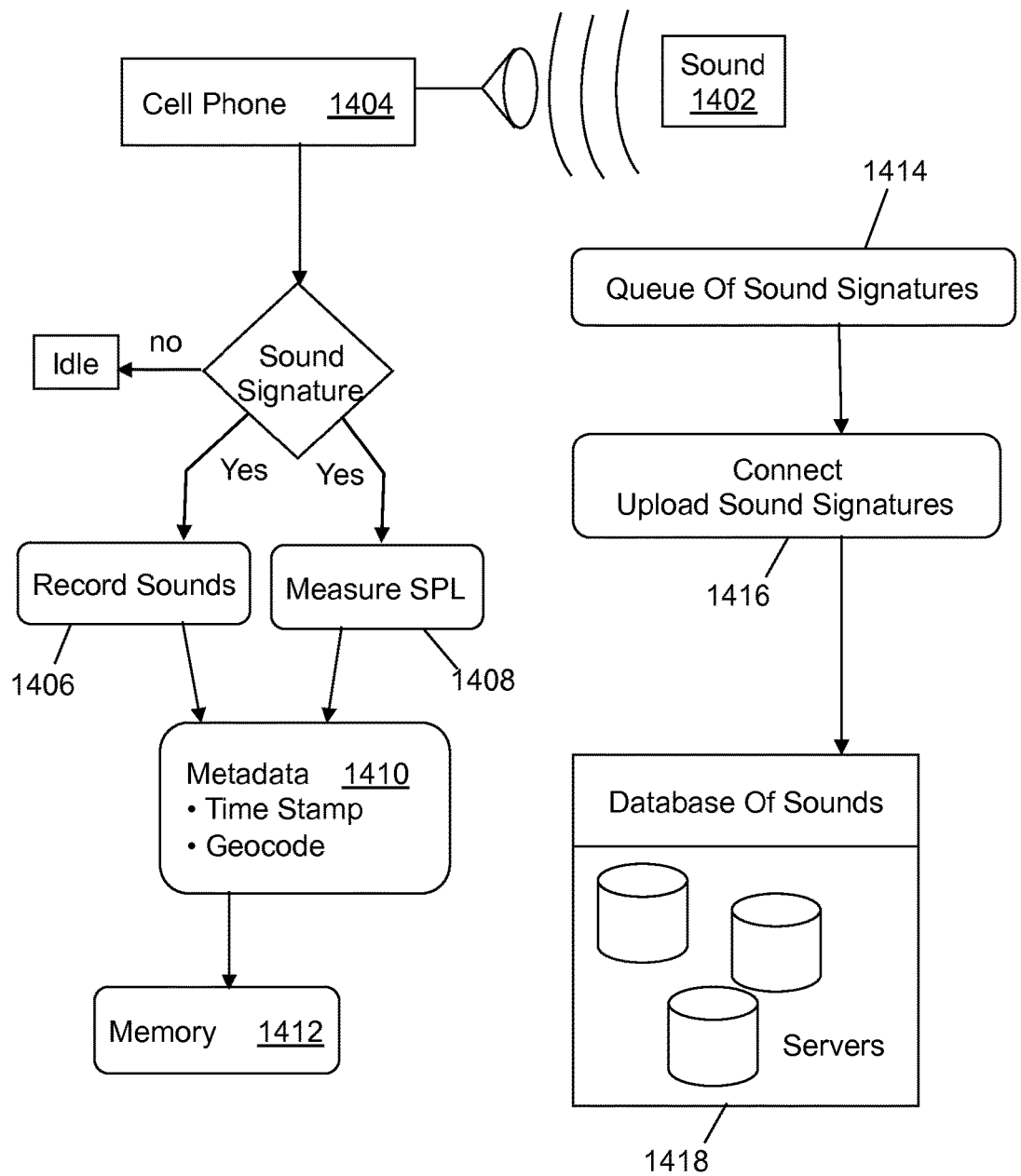
FIG. 14 illustrates a block diagram of a cell phone capturing a sonic signature and providing the sonic signature to a database of sounds in accordance with at least one exemplary embodiment.

FIG. 14 is a block diagram illustrating a cell phone 1404 capturing a sonic signature and providing the sonic signature to a database of sounds 1418 in accordance with at least one exemplary embodiment. Cell phone 1404 is enabled for capturing a sonic signature via an exclusive button or through an automatic process. In at least one exemplary embodiment, the user can select whether a sound is recorded, a sound pressure level measurement is recorded, or both are acquired. A default can be that both are acquired automatically.

A sound 1402 is received by a microphone on cell phone 1404 and stored in a buffer in a record sounds step 1406. The sound in the buffer is analyzed and determined to be saved. The sound pressure level (SPL) of the sonic signature is measured or calculated in a measure SPL step 1408. The user can also manually enter metadata 1410 via a keyboard to a metadata table or can enter vocal description in an attached audio stream. Metadata 1410 includes a time stamp and a geocode corresponding to the sonic signature.

In at least one exemplary embodiment, the sonic signature, sound pressure level, and metadata can be stored in memory 1412 that resides on cell phone 1404. A queue of sonic signatures 1414 can be stored in memory 1412 for uploading at an appropriate time. The user can initiate uploading of the queue of sonic signatures 1414 to database of sounds 1418 when a communication path is completed. In at least one exemplary embodiment, cell phone 1404 can automatically connect 1416 to servers in database of sounds 1418 and upload queue of sonic signatures 1414 when a communication path is enabled. Although stored on database of sounds 1418, there may be an iterative process to determine if the sonic signatures are in the correct format or are unique enough to be permanently stored. Thus, a large database of sounds 1418 can be collected world wide by an automatic process using a common device such as a cell phone that could not be accomplished by direct means. In at least one exemplary embodiment, the database of sounds 1418 is used in conjunction with personalized sound management applications configured to provide sonic signatures for identifying and providing a response to the identified sound.

To encourage retailers to actively engage and participate in selling Hearium Labs branded products, a business model has been developed based on an annuity revenue sharing methodology. Through this patent pending approach, for the first time, retailers, operators and other suppliers will be able to carry a single audio earpiece or other device in their stores that can be sold to a wide and deep range of consumers. Utilizing an "iPod/iTunes" approach, suppliers will earn profit off the sale of the hardware in store and Personalized Sound Management applications at and after the point of sale. As the consumer continues to personalize their earpiece or device over time, the supplier will earn residuals of up to 50% of the application revenues through a co-operative sharing program between them and Hearium Labs.

To accomplish this, Hearium Labs has enabled the hardware solution to work off of a webified environment that is being architected with commercial flexibility for consumer driven point of sale purchase and activation. This approach allows for the Personalized Sound Management applications to be remotely downloaded and activated on the hardware through any Internet equipped PC and web-based browser. Consumers will thus be able to "enhance" their devices by adding both purchased and subscription applications and personalize their experience with technology designed to acclimate devices to the wearer and their environment.

In general, a process has been provided that eliminates barriers for mass adoption of a new technology. The result is that the technology can be provided by a number of manufacturers thereby having ubiquitous availability at release. Universal compatibility is also provided by using the same hardware and software in each new product having personalized sound management. Certification ensures that each device is manufacturable and performs to specification. Manufacturers and consumers benefit because liability coverage may be provided. Consumers can adapt to the technology rapidly through an acclimation process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method for personalized sound management for an earpiece device including at least one transducer, a microprocessor, digital signal processor, or logic circuit having a memory and a data communication system, the method comprising:
  maintaining a database of sonic signatures composed of acoustic information specific to a predetermined sound;
  displaying on a visual display, a plurality of personalized sound management applications in a list, the plurality of personalized sound management applications providing customizable solutions that allow a user to handle a variety of tasks associated with managing an acoustic space based upon the user, the earpiece device and the acoustic space being managed, wherein the plurality of personalized sound management applications displayed in the list are adjusted based on the user, the earpiece device, and a type of the acoustic space,
  disabling the earpiece device upon detecting that at least one personalized sound management application of the plurality of personalized sound management applications has been tampered with, detecting that the user does not match with the earpiece, or detecting a combination thereof;
  wherein the personalized sound applications perform at least one or more among the tasks among:
    identifying a sonic signature composed of acoustic information specific to a predetermined sound using a Gaussian mixture model completely specified by a mixture of mean vectors, a mixture of covariance matrices, and a mixture of weights, calculating a sound pressure level of a sonic signature composed of acoustic information specific to a predetermined sound, storing metadata related to a sonic signature composed of acoustic information specific to a predetermined sound, wherein the metadata relates to a sonic signature and a sound pressure level including a time stamp and a geocode, monitoring sound pressure level dosage levels from long term and transient sound exposures and intelligently protecting hearing from damage by employing amplification level control, switching to an ear canal microphone in a noisy environment and combining sound from the ear canal microphone and an ambient microphone to provide a natural sounding voice at a receiving end, recording a user's voice, storing the user's voice in the memory of the device, and storing the user's voice in a memory of the server system, and converting received text received in texts or emails to voice using text to speech conversion;

receiving, by the microprocessor, digital signal processor, or logic circuit, a selection of at least one of the plurality of different personalized sound management applications for performing tasks, where the at least one personalized sound management application is selected from the plurality of personalized sound management applications displayed on the display, each of the plurality of personalized sound management applications including a corresponding processing of acoustic information for performing the tasks wherein the sound management applications include tasks personalized for safety, human-machine intelligence, quality of life features or occupational parameters;

responsive to the selection, loading the selected at least one personalized sound management application including the corresponding processing of acoustic information from a server system to the device or to a mobile device using the data communication system and storing the at least one sound management application including the corresponding processing of acoustic information into the memory for execution on the microprocessor, digital signal processor, or logic circuit;

receiving information from among at least one of the at least one of the transducer, the memory and the data communication system;

selectively processing, by the microprocessor, digital signal processor, or logic circuit, the received information using the processing algorithm corresponding to the stored at least one sound management application;

controlling, by the microprocessor, digital signal processor, or logic circuit, a signal to or from at least one of the at least one transducer, the memory or the data communication system responsive to the processed information.

2. A personalized sound management system for an acoustic space, comprising:

at least one transducer, a data communication system, one or more processors operatively coupled to the data communication system and the at least one transducer; and a non-transitory computer medium coupled to the one or more processors, the medium containing instructions when executed by the one or more processors to cause the one or more processors to perform operations comprising:

accessing a database of sonic signatures composed of acoustic information specific to a predetermined sound; and displaying on a visual display, a plurality of personalized sound management applications in a list, the plurality of personalized sound management applications providing customizable solutions that handle a variety of tasks associated with managing the acoustic space and, wherein the plurality of personalized sound management applications displayed in the list are adjusted based on a user, an earpiece device, and a type of the acoustic space, disabling the earpiece device upon detecting that at least one personalized sound management application of the plurality of personalized sound management applications has been tampered with, detecting that the user does not match with the earpiece, or detecting a combination thereof;

wherein the personalized sound applications perform at least one or more tasks among:

identifying a sonic signature composed of acoustic information specific to a predetermined sound using a Gaussian mixture model completely specified by a mixture of mean vectors, a mixture of covariance matrices, and a mixture of weights, calculating a sound pressure level of a sonic signature composed of acoustic information specific to a predetermined sound, storing metadata related to a sonic signature composed of acoustic information specific to a predetermined sound, wherein the metadata relates to a sonic signature and a sound pressure level including a time stamp and a geocode, monitoring sound pressure level dosage levels from long term and transient sound exposures and intelligently protecting hearing from damage by employing amplification level control, switching to an ear canal microphone in a noisy environment and combining sound from the ear canal microphone and an ambient microphone to provide a natural sounding voice at a receiving end, recording the user's voice, storing the user's voice in a memory of an earpiece device, or storing the user's voice in a memory of a server system, or converting received text received in texts or emails to voice using text to speech conversion.

3. The system of claim 2, wherein the one or more processors receives a selection of at least one of the plurality of different personalized sound management applications for performing tasks, where the at least one personalized sound management application is selected from the plurality of personalized sound management applications displayed on the display, each of the plurality of personalized sound management applications including a corresponding processing of acoustic information for performing the tasks wherein the sound management applications include tasks personalized for safety, human-machine intelligence, quality of life features or occupational parameters.

4. The system of claim 3, wherein, responsive to the selection, the one or more processors loads the selected at least one personalized sound management application including the corresponding processing of acoustic information from a server system to the earpiece device or to a mobile device using the data communication system and storing the at least one sound management application including the corresponding processing of acoustic information into the memory for execution on the one or more processors.

5. The system of claim 2, wherein the one or more processors receives information from among at least one of the at least one of the transducer, the memory or the data communication system.

6. The system of claim 5, wherein the one or more processors selectively processes the received information using the processing algorithm corresponding to the stored at least one sound management application.

7. The system of claim 6, wherein the one or more processors a signal to or from at least one of the at least one transducer, the non-transitory computer medium or the data communication system responsive to the processed information.

8. The system of claim 2, wherein the personalized sound management system is for an earpiece device having the transducer.

9. The system of claim 2, wherein the personalized sound management system is for a media device.

10. The system of claim 2, wherein the personalized sound management system is for a vehicle.

11. The system of claim 2, wherein the at least one or more tasks further comprise identifying the sonic signature composed of acoustic information specific to the predetermined sound using the Gaussian mixture model completely specified by the mixture of mean vectors, the mixture of covariance matrices, and the mixture of weights.

12. The system of claim 2, wherein the at least one or more tasks further comprise-calculating the sound pressure level of the sonic signature composed of acoustic information specific to the predetermined sound.

13. The system of claim 2, wherein the at least one or more tasks further comprise storing metadata related to the sonic signature composed of acoustic information specific to the predetermined sound, wherein the metadata relates to the sonic signature and the sound pressure level including the time stamp and the geocode.

14. The system of claim 2, wherein the operations further comprise verifying a voice of the user based on speech received from the user.

15. The system of claim 2, wherein the at least one or more tasks further comprise monitoring sound pressure level dosage levels from long term and transient sound exposures and intelligently protecting hearing from damage by employing amplification level control.

16. The system of claim 2, wherein the at least one or more tasks further comprise switching to the ear canal microphone in the noisy environment and combining sound from the ear canal microphone and the ambient microphone to provide the natural sounding voice at the receiving end.

17. The system of claim 2, wherein the at least one or more tasks further comprise recording the user's voice, storing the user's voice in the memory of the earpiece device, or storing the user's voice in the memory of the server system.

18. The system of claim 2, wherein the operations further comprise facilitating selection of at least one of the plurality of different personalized sound management applications via a website, and wherein the operations further comprise accepting a subscription contract for using the at least one of the plurality of different personalized sound management applications.

19. The system of claim 2, wherein the at least one or more tasks further comprise converting received text received in texts or emails to voice using text to speech conversion.

20. A personalized sound management system at a server for an acoustic space associated with an earpiece, a media device, or a vehicle having at least one transducer, the server comprising:
a data communication system, one or more processors operatively coupled to the data communication system and the at least one transducer; and
a non-transitory computer medium coupled to the one or more processors, the medium containing instructions when executed by the one or more processors to cause the one or more processors to perform operations comprising:
accessing a database of sonic signatures composed of acoustic information specific to a predetermined sound;
causing a visual display to display a plurality of personalized sound management applications in a list, the plurality of personalized sound management applications providing customizable solutions that handle a variety of tasks associated with managing the acoustic space and, wherein the plurality of personalized sound management applications displayed in the list are adjusted based on a user, the earpiece device, and a type of the acoustic space,
disabling the earpiece device upon detecting that at least one personalized sound management application of the plurality of personalized sound management applications has been tampered with, detecting that the user does not match with the earpiece, or detecting a combination thereof;
wherein the personalized sound applications perform at least one or more tasks among:
identifying a sonic signature composed of acoustic information specific to a predetermined sound using a Gaussian mixture model completely specified by a mixture of mean vectors, a mixture of covariance matrices, and a mixture of weights, calculating a sound pressure level of a sonic signature composed of acoustic information specific to a predetermined sound, storing metadata related to a sonic signature composed of acoustic information specific to a predetermined sound, wherein the metadata relates to a sonic signature and a sound pressure level including a time stamp and a geocode, monitoring sound pressure level dosage levels from long term and transient sound exposures and intelligently protecting hearing from damage by employing amplification level control, switching to an ear canal microphone in a noisy environment and combining sound from the ear canal microphone and an ambient microphone to provide a natural sounding voice at a receiving end, recording the user's voice, storing the user's voice in a memory of an earpiece device, or storing the user's voice in a memory of a server system, or converting received text received in texts or emails to voice using text to speech conversion.

* * * * *